(12) United States Patent
Hsu et al.

(10) Patent No.: US 12,493,172 B2
(45) Date of Patent: Dec. 9, 2025

(54) CAMERA MODULE AND ELECTRONIC DEVICE

(71) Applicant: LARGAN PRECISION CO., LTD., Taichung (TW)

(72) Inventors: Wen-Hung Hsu, Taichung (TW); Heng Yi Su, Taichung (TW); Ming-Ta Chou, Taichung (TW); Te-Sheng Tseng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 357 days.

(21) Appl. No.: 18/134,519

(22) Filed: Apr. 13, 2023

(65) Prior Publication Data
US 2024/0231056 A1 Jul. 11, 2024

Related U.S. Application Data

(60) Provisional application No. 63/437,566, filed on Jan. 6, 2023.

(51) Int. Cl.
*G02B 13/00* (2006.01)
*G02B 27/64* (2006.01)
(Continued)

(52) U.S. Cl.
CPC ....... *G02B 13/0065* (2013.01); *G02B 27/646* (2013.01); *G03B 3/06* (2013.01);
(Continued)

(58) Field of Classification Search
CPC .... G02B 13/0065; G02B 27/646; G03B 3/06; G03B 5/04; G03B 13/36; G03B 17/12;
(Continued)

(56) References Cited

U.S. PATENT DOCUMENTS 9,618,770 B2 4/2017 Park et al.
9,832,383 B2 11/2017 Hwang et al.
(Continued)

FOREIGN PATENT DOCUMENTS

| CN | 217484583 U | 9/2022 |
| EP | 4191312 A1 | 6/2023 |
| TW | 202115452 A | 4/2021 |

OTHER PUBLICATIONS

European Search Report issued in corresponding application No. 23164384.2, dated Aug. 25, 2023.

*Primary Examiner* — Daniel Petkovsek
(74) *Attorney, Agent, or Firm* — Maschoff Brennan

(57) ABSTRACT

A camera module includes a casing, a base, an imaging lens module, a driving module, an image stabilization module and an image sensor. The base is coupled to the casing, forming an accommodation space. The imaging lens module is disposed in the accommodation space and includes an imaging lens and a plastic light-folding element. The driving module includes a first holder, a fixed frame, a first rollable support and a first driving mechanism. The first holder holds the plastic light-folding element. The fixed frame is disposed corresponding to the first holder. The first rollable support is disposed between the first holder and the fixed frame. The first driving mechanism is configured to drive the first holder to move relative to the fixed frame. The image stabilization module is configured to drive the imaging lens or the image sensor to move in a direction perpendicular to the optical axis.

24 Claims, 46 Drawing Sheets

(51) Int. Cl.

| | | |
|---|---|---|
| *G03B 3/06* | (2021.01) | |
| *G03B 5/04* | (2021.01) | |
| *G03B 17/12* | (2021.01) | |
| *H02K 41/035* | (2006.01) | |
| *H04M 1/02* | (2006.01) | |
| *H04N 23/55* | (2023.01) | |
| *H04N 23/68* | (2023.01) | |
| *G03B 13/36* | (2021.01) | |
| *G03B 30/00* | (2021.01) | |

(52) U.S. Cl.
CPC ............... *G03B 5/04* (2013.01); *G03B 17/12* (2013.01); *H02K 41/0354* (2013.01); *H04M 1/0264* (2013.01); *H04N 23/55* (2023.01); *H04N 23/687* (2023.01); *G03B 13/36* (2013.01); *G03B 30/00* (2021.01); *G03B 2205/0015* (2013.01); *G03B 2205/0069* (2013.01)

(58) Field of Classification Search
CPC ............ G03B 30/00; G03B 2205/0015; G03B 2205/0069; H04M 1/0264; H02K 41/0354; H04N 23/55; H04N 23/687
See application file for complete search history.

(56) References Cited

U.S. PATENT DOCUMENTS

| | | | |
|---|---|---|---|
| 9,848,126 | B2 | 12/2017 | Kang et al. |
| 9,955,077 | B2 | 4/2018 | Lim et al. |
| 11,375,091 | B1 | 6/2022 | Mireault et al. |
| 11,431,883 | B2 | 8/2022 | Chang et al. |
| 11,442,257 | B2 | 9/2022 | Lin et al. |
| 11,609,404 | B2 * | 3/2023 | Yoon ................. G03B 5/00 |
| 2020/0057313 | A1 * | 2/2020 | Lee ................... G03B 5/00 |
| 2021/0286149 | A1 | 9/2021 | Yoon et al. |
| 2021/0302691 | A1 | 9/2021 | Bachar et al. |
| 2022/0066291 | A1 | 3/2022 | Hong |
| 2022/0082782 | A1 * | 3/2022 | Su ..................... G02B 7/04 |
| 2022/0091397 | A1 | 3/2022 | Brodie et al. |
| 2022/0196993 | A1 | 6/2022 | Liao et al. |
| 2022/0279093 | A1 | 9/2022 | Kwon et al. |
| 2022/0307864 | A1 | 9/2022 | Yedid et al. |
| 2022/0342276 | A1 | 10/2022 | Min et al. |

* cited by examiner

CAMERA MODULE AND ELECTRONIC DEVICE

RELATED APPLICATIONS

This application claims priority to U.S. Provisional Application 63/437,566, filed on Jan. 6, 2023, which is incorporated by reference herein in its entirety.

BACKGROUND

Technical Field

The present disclosure relates to a camera module and an electronic device, more particularly to a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems, especially the telephoto optical systems with a long focal length, are difficult to meet both the requirements of high image quality and compactness. Conventional telephoto optical systems usually have shortcomings of overly long total length, poor image quality or overly large size, which is unable to meet the requirements of the current technology trends. To achieve compactness, the optical systems may be configured to have a folded optical axis so as to reduce the dimension of the optical systems in a specific direction, thereby reducing the total system size. Moreover, the optical systems can be configured with anti-vibration function for achieving high image quality. However, to meet the abovementioned requirements, a driving unit of complex structure is required to drive an optical axis folding element, which results in more complex structure and more weight of the optical systems.

Accordingly, how to improve the optical systems for simplifying the structure of the lens assembly, achieving a compact size and maintaining high image quality so as to meet the requirement of high-end-specification electronic devices is an important topic in this field nowadays.

SUMMARY

According to one aspect of the present disclosure, a camera module includes a casing, a base, an imaging lens module, a driving module, an image stabilization module and an image sensor. The casing has an opening. The base is coupled to the casing, and the base and the casing together form an accommodation space. The imaging lens module is disposed in the accommodation space, and the imaging lens module includes an imaging lens and a plastic light-folding element. The imaging lens is disposed corresponding to the opening of the casing, and an optical axis of the imaging lens passes through the opening of the casing. The plastic light-folding element is located on the optical axis and configured to fold the optical axis at least one time. The driving module is configured to drive the plastic light-folding element to move in a direction parallel to the optical axis, and the driving module includes a first holder, a fixed frame, a first rollable support and a first driving mechanism. The first holder holds the plastic light-folding element, the fixed frame is disposed corresponding to the first holder, and the first rollable support is disposed between the first holder and the fixed frame. The first driving mechanism is configured to drive the first holder to move relative to the fixed frame. The image stabilization module is configured to drive the imaging lens to move in a direction perpendicular to the optical axis. The image sensor is disposed on an image surface of the imaging lens, and the image sensor is configured to convert an imaging light passing through the imaging lens module into an image signal. In addition, the plastic light-folding element is located on an image side of the imaging lens.

When a deviated distance between a center of the imaging lens and a center of the image sensor in a direction perpendicular to the optical axis is D, the following condition is satisfied: 2 mm<D<22 mm.

According to another aspect of the present disclosure, a camera module includes a casing, a base, an imaging lens module, a driving module, an image sensor and an image stabilization module. The casing has an opening. The base is coupled to the casing, and the base and the casing together form an accommodation space. The imaging lens module is disposed in the accommodation space, and the imaging lens module includes an imaging lens and a plastic light-folding element. The imaging lens is disposed corresponding to the opening of the casing, and an optical axis of the imaging lens passes through the opening of the casing. The plastic light-folding element is located on the optical axis and configured to fold the optical axis at least one time. The driving module is configured to drive the plastic light-folding element to move in a direction parallel to the optical axis, and the driving module includes a first holder, a fixed frame, a rollable support and a first driving mechanism. The first holder holds the plastic light-folding element, the fixed frame is disposed corresponding to the first holder, and the rollable support is disposed between the first holder and the fixed frame. The first driving mechanism is configured to drive the first holder to move relative to the fixed frame. The image sensor is disposed on an image surface of the imaging lens, and the image sensor is configured to convert an imaging light passing through the imaging lens module into an image signal. The image stabilization module is configured to drive the image sensor to move in a direction perpendicular to the optical axis. In addition, the plastic light-folding element is located on an image side of the imaging lens.

When a deviated distance between a center of the imaging lens and a center of the image sensor in a direction perpendicular to the optical axis is D, the following condition is satisfied: 2 mm<D<22 mm.

According to another aspect of the present disclosure, an electronic device includes one of the aforementioned camera modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
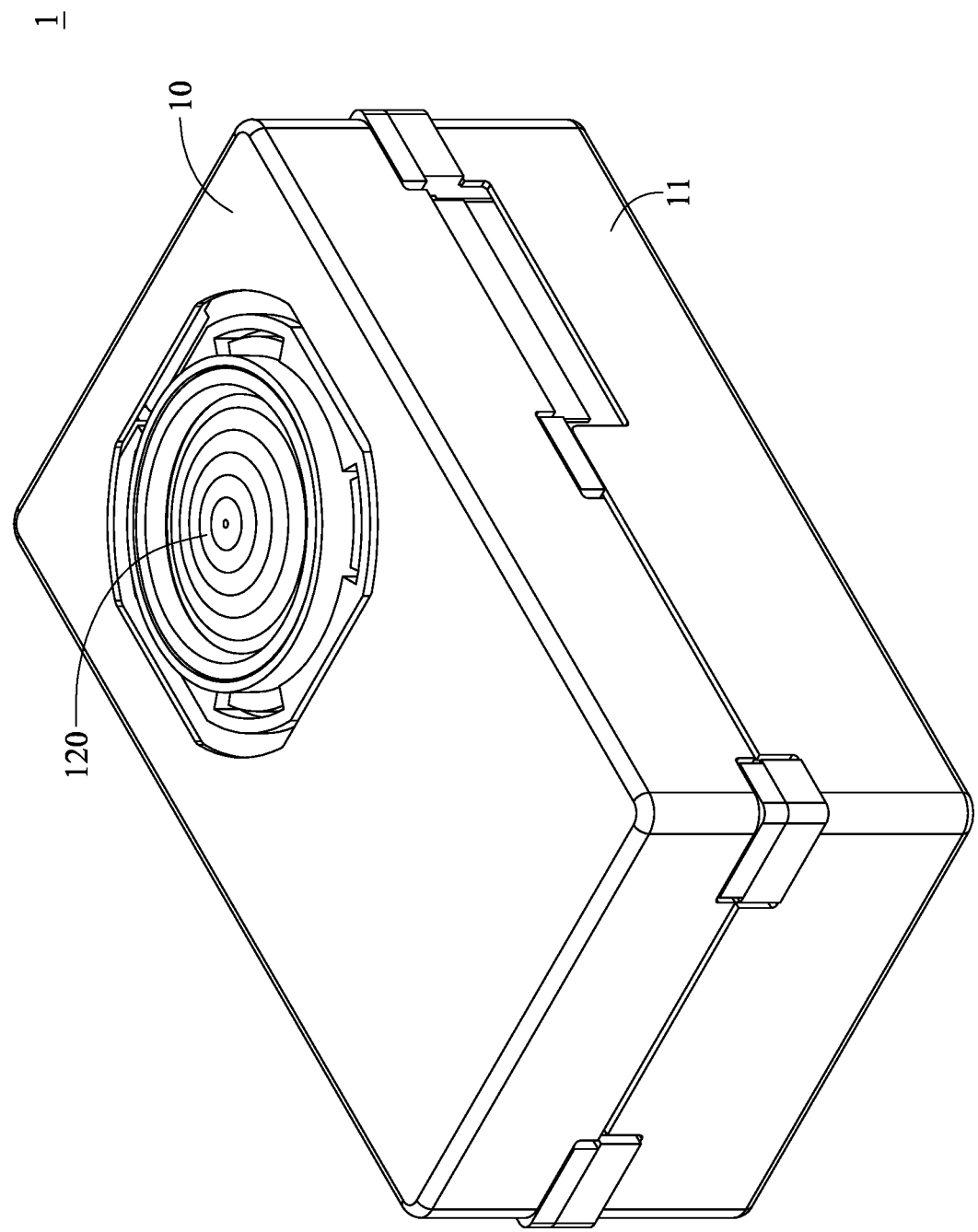
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a camera module. The camera module includes a casing, a base, an imaging lens module, a driving module, an image sensor and an image stabilization module.

The casing has an opening. The base and the casing are coupled with each other and together form an accommodation space. In addition, the base can be made, for example, by a metal stamping process, a sheet metal bending process or a plastic injection molding process, but the present disclosure is not limited thereto.

The imaging lens module is disposed in the accommodation space, and the imaging lens module includes an imaging lens and a plastic light-folding element. The imaging lens is disposed corresponding to the opening of the casing, and an optical axis of the imaging lens passes through the opening of the casing, such that the imaging lens can be exposed to the outside of the camera module by the opening of the casing. The plastic light-folding element is located on the optical axis and configured to fold the optical axis at least one time. In addition, the plastic light-folding element is located on an image side of the imaging lens. Moreover, the plastic light-folding element can be, for example, a prism, but the present disclosure is not limited thereto.

The driving module is configured to drive the plastic light-folding element to move in a direction parallel to the optical axis. Specifically, the driving module includes a first holder, a fixed frame, a first rollable support and a first driving mechanism. The first holder is configured to hold the plastic light-folding element. The fixed frame is disposed corresponding to the first holder. The first rollable support is disposed between the first holder and the fixed frame. The first driving mechanism is configured to drive the first holder to move relative to the fixed frame. Moreover, the first rollable support can provide the first holder with a degree of freedom associated with translational motion in a direction parallel to the optical axis relative to the fixed frame. Moreover, the first rollable support can be, for example, spherical, but the present disclosure is not limited thereto. In this disclosure, when the optical axis is parallel to Z-axis, a direction perpendicular to the optical axis is any direction on an XY-plane defined by X-axis and Y-axis. Furthermore, in this disclosure, said direction parallel to the optical axis refers to a direction parallel to a part of the optical axis before entering the plastic light-folding element, and said direction perpendicular to the optical axis refers to a direction perpendicular to the part of the optical axis before entering the plastic light-folding element.

The image sensor is disposed on an image surface of the imaging lens, and the image sensor is configured to convert an imaging light passing through the imaging lens module into an imaging signal.

The image stabilization module is configured to drive the imaging lens or the image sensor to move in a direction perpendicular to the optical axis. Moreover, the image stabilization module can be, for example, an optical image stabilization (OIS) module, but the present disclosure is not limited thereto.

When a deviated distance between a center of the imaging lens and a center of the image sensor in a direction perpendicular to the optical axis is D, the following condition is satisfied: 2 mm<D<22 mm. Therefore, it is favorable for obtaining a predetermined range of deviated distance for better space utilization. Moreover, the following condition can also be satisfied: 4 mm<D<17 mm.

According to the present disclosure, an auto focusing function is achieved by the driving module using spherical rollable support, such that the structural stability of the holder of the driving module can be increased. In addition, the collaboration with the prism made of plastic material served as a light-folding element is favorable for reducing the total weight of the camera module. Moreover, the imaging lens or the image sensor can be driven to move in the XY-plane by the image stabilization module, which is favorable for obtaining high quality images and improving operation quality of the camera module.

In one configuration, the imaging lens module, the driving module, the image stabilization module and the image sensor can be all disposed in the accommodation space, but the present disclosure is not limited thereto.

The imaging lens and the image sensor can be located on the same side of the plastic light-folding element. Therefore, when the driving module drives the plastic light-folding element to move in a direction parallel to the optical axis, the displacement of the plastic light-folding element can be reduced by half, thereby increasing the driving efficiency of the driving module.

An imaging light travelling along the optical axis in the plastic light-folding element can undergo total internal reflection. Specifically, by selecting a proper reflective index of the plastic light-folding element, the imaging light can undergo total internal reflection(s) in the plastic light-folding element. Moreover, in one configuration where the plastic light-folding element has a plurality of reflection surfaces, an imaging light can undergo multiple total internal reflections in the plastic light-folding element by the reflection surfaces. Therefore, the effect of the total internal reflections in a single plastic light-folding element having plural reflection surfaces can be equivalent to the optical property of multiple light-folding elements each having one reflection surface assembled together capable of folding the optical axis, thereby reducing manufacturing costs.

The plastic light-folding element can have at least one gate trace and at least one reflection surface. The at least one reflection surface is configured to fold the optical axis. In one configuration, the number of the gate trace can be one, and the number of the reflection surfaces can be three. Therefore, it is favorable for the camera module to be light in weight and compact in size. Moreover, two of the three reflection surfaces of the plastic light-folding element can be symmetrically arranged with respect to the gate trace as a center. Therefore, it is favorable for the plastic material to evenly flow to the reflection-surface-forming area during an injection molding process so as to ensure the quality of the reflection surface. Moreover, when a deviated distance between a center of the gate trace and a center of one of the two reflection surfaces symmetrically arranged in a direction perpendicular to the optical axis is d1, and a deviated distance between the center of the gate trace and a center of the other of the two reflection surfaces in a direction perpendicular to the optical axis is d2, the following condition can be satisfied: |d1−d2|<0.085 mm. Therefore, it is favorable for obtaining a predetermined range of deviated distance for better reflection surface quality.

The plastic light-folding element can further have at least one recessed structure extending and tapering off from the outer surface of the plastic light-folding element toward the at least one gate trace. In addition, the recessed structure can block light rays so as to prevent non-imaging light of particular incident angles from entering the image sensor. Therefore, it is favorable for increasing the efficiency of blocking non-imaging light. In one configuration, a light-absorption layer can be disposed on the recessed structure.

An Abbe number of the plastic light-folding element can be larger than or equal to 35 and smaller than or equal to 65. Therefore, it is favorable for reducing chromatic aberration so as to improve the image quality. In one configuration, the Abbe number of the plastic light-folding element can be 37.4. In one configuration, the Abbe number of the plastic light-folding element can be 56. In one configuration, the Abbe number of the plastic light-folding element can be 56.8.

The first driving mechanism of the driving module can include a first magnet and a first coil. The first magnet can be fixed to the first holder, and the first coil can be disposed corresponding to the first magnet so as to provide a driving force for driving the first holder to move relative to the fixed frame.

The driving module can further include a first ferromagnetic element, and the first ferromagnetic element can be disposed corresponding to the first magnet of the first driving mechanism. Therefore, a magnetic attraction force can be further provided to the driving module. Moreover, the first ferromagnetic element and the first holder can be integrally formed by an insert molding process. Therefore, the magnetic attraction force collaborated with the arrangement of the first ferromagnetic element and the first holder integrally formed is favorable for increasing the assembling stability between the first magnet and the first holder.

In one configuration, the image stabilization module can include a second holder, a movable plate, a second rollable support, a fixed base, a third rollable support, a second driving mechanism and a second ferromagnetic element. The second holder can hold the imaging lens, the movable plate and the second holder can be disposed corresponding to each other, and the second rollable support can be disposed between the second holder and the movable plate. Moreover, the second rollable support can provide the second holder with a degree of freedom associated with translational motion in a direction perpendicular to the optical axis relative to the fixed base. The fixed base and the movable plate can be disposed corresponding to each other, and the third rollable support can be disposed between the movable plate and the fixed base. Moreover, the third rollable support can provide the second holder with a degree of freedom associated with translational motion in another direction perpendicular to the optical axis relative to the fixed base. Moreover, the second rollable support and the third rollable support can be, for example, spherical, but the present disclosure is not limited thereto.

The second driving mechanism can be configured to drive the second holder to move relative to the fixed base. For example, the second driving mechanism can include a second magnet and a second coil. The second magnet can be fixed to the second holder, and the second coil can be disposed corresponding to the second magnet so as to provide a driving force for the second holder to move relative to the fixed base.

The second ferromagnetic element can be disposed corresponding to the second magnet of the second driving mechanism. Therefore, a magnetic attraction force can be further provided to the image stabilization module. Moreover, the second ferromagnetic element and the second holder can be integrally formed by an insert molding process. Therefore, the magnetic attraction force collaborated with the arrangement of the second ferromagnetic element and the second holder integrally formed is favorable for increasing the assembling stability between the second magnet and the second holder.

In another configuration, the image stabilization module can include a second holder, a fixed base and a second driving mechanism. The second holder can include a carrier plate, an elastic connection component, a contact component, a substrate, a flexible printed circuit board and a printed circuit board. The carrier plate can support the image sensor. One end of the elastic connection component can be connected to the carrier plate, and another end of the elastic connection component can be connected to the contact component. The fixed base can have a corresponding portion in physical contact with the contact component of the second holder, such that the elastic connection component can provide the second holder with a degree of freedom associated with translational motion relative to the fixed base. The flexible printed circuit board can be provided on the carrier plate. The substrate can be provided on and electrically connected to the flexible printed circuit board. The printed circuit board can be provided on and electrically connected to the substrate. The image sensor can be provided on and electrically connected to the substrate. Therefore, the image sensor is indirectly disposed on the carrier plate by the substrate and the flexible printed circuit board so as to be movable along with the carrier plate relative to the fixed base. However, the above described arrangement is only exemplary, and the present disclosure is not limited thereto.

The second driving mechanism can be configured to drive the second holder to move relative to the fixed base. For example, the second driving mechanism can include a second magnet and a second coil. The second coil can be disposed on the printed circuit board of the second holder, and the second magnet can be disposed corresponding to the second coil so as to provide a driving force for driving the printed circuit board to move, such that the second driving mechanism can drive the second holder to move relative to the fixed base.

According to the present disclosure, an electronic device is provided. The electronic device includes the aforementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
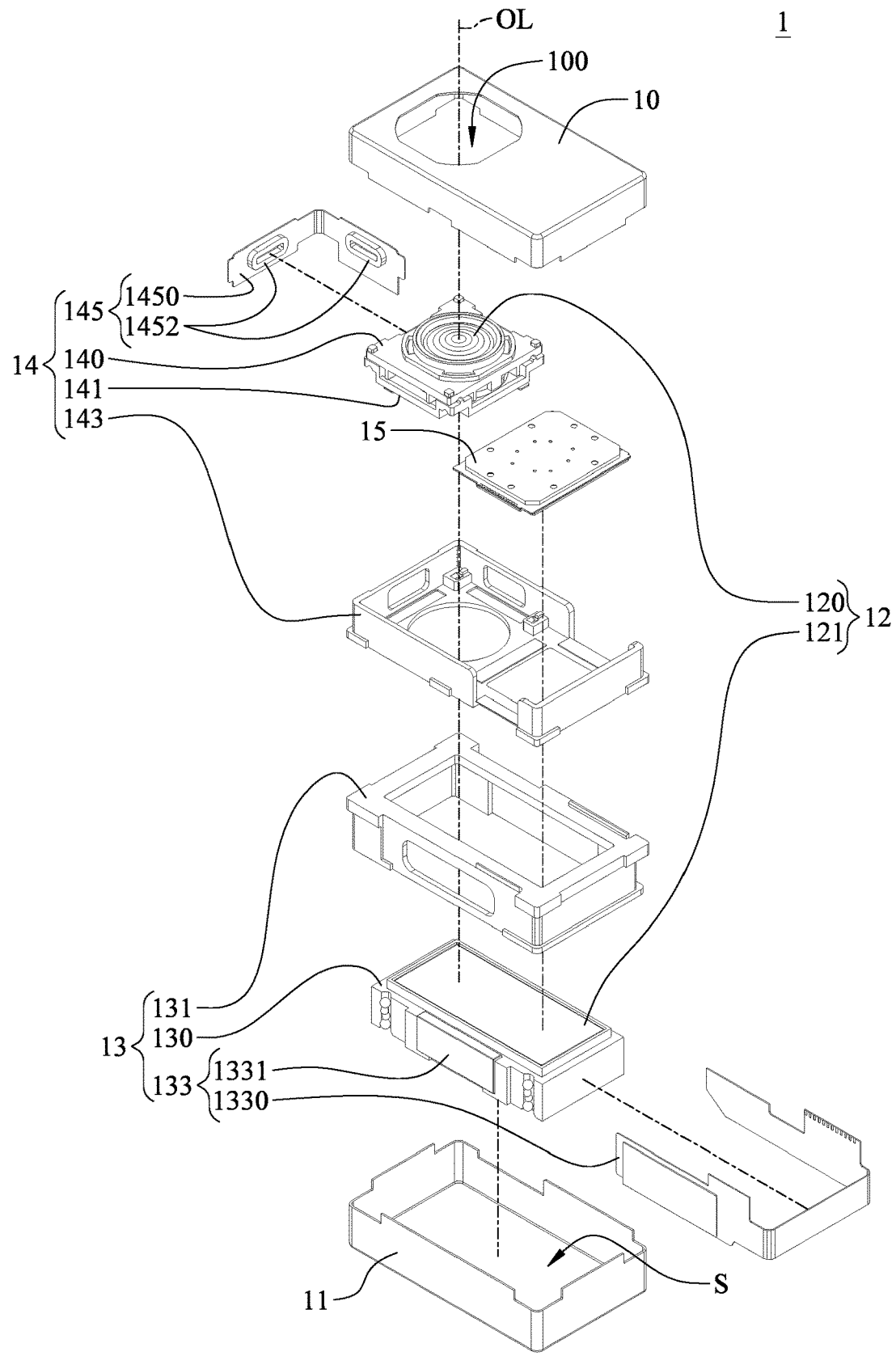
FIG. 2 is an exploded view of the camera module in FIG. 1.
Figure 3:
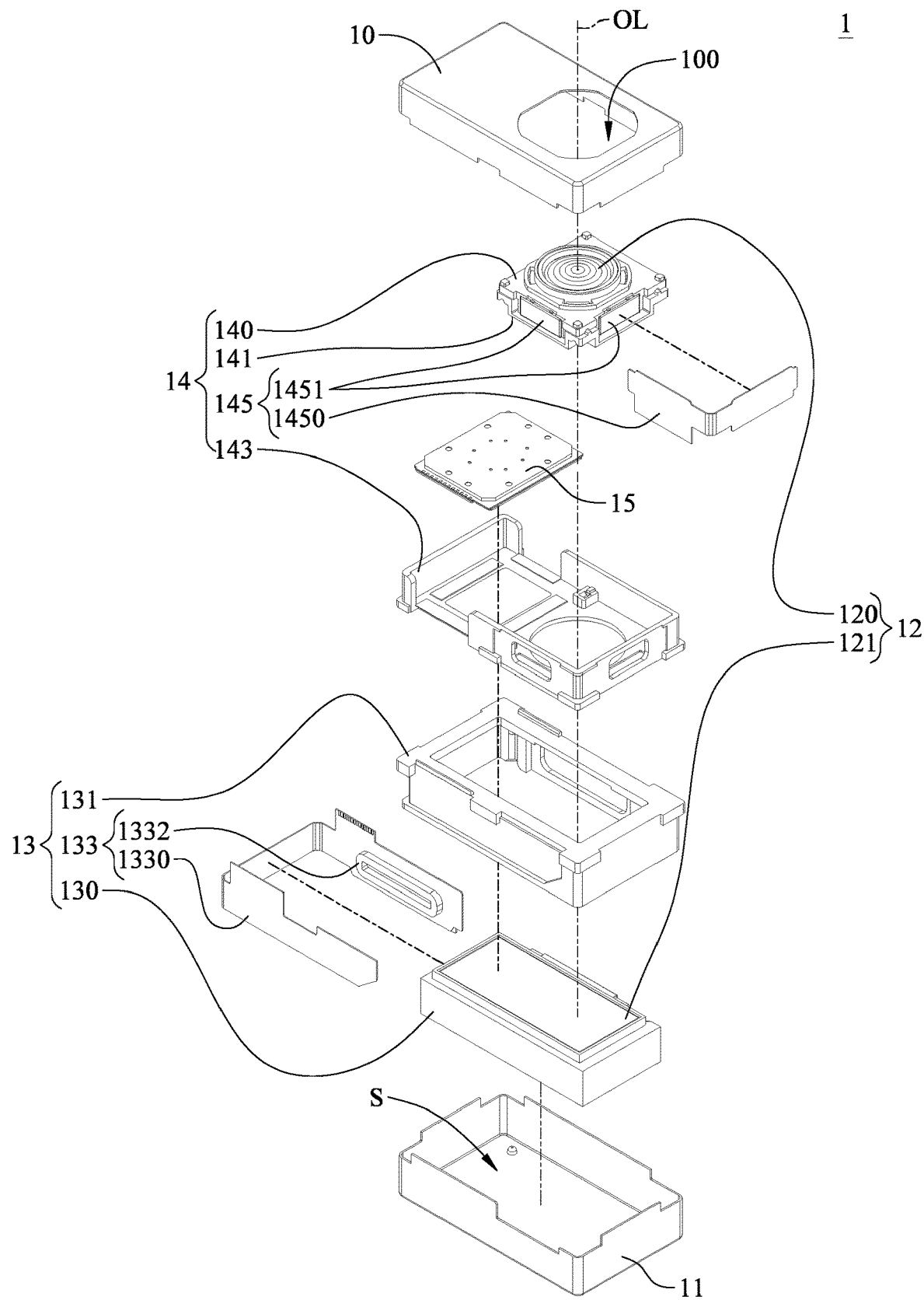
FIG. 3 is another exploded view of the camera module in FIG. 1.
Figure 4:
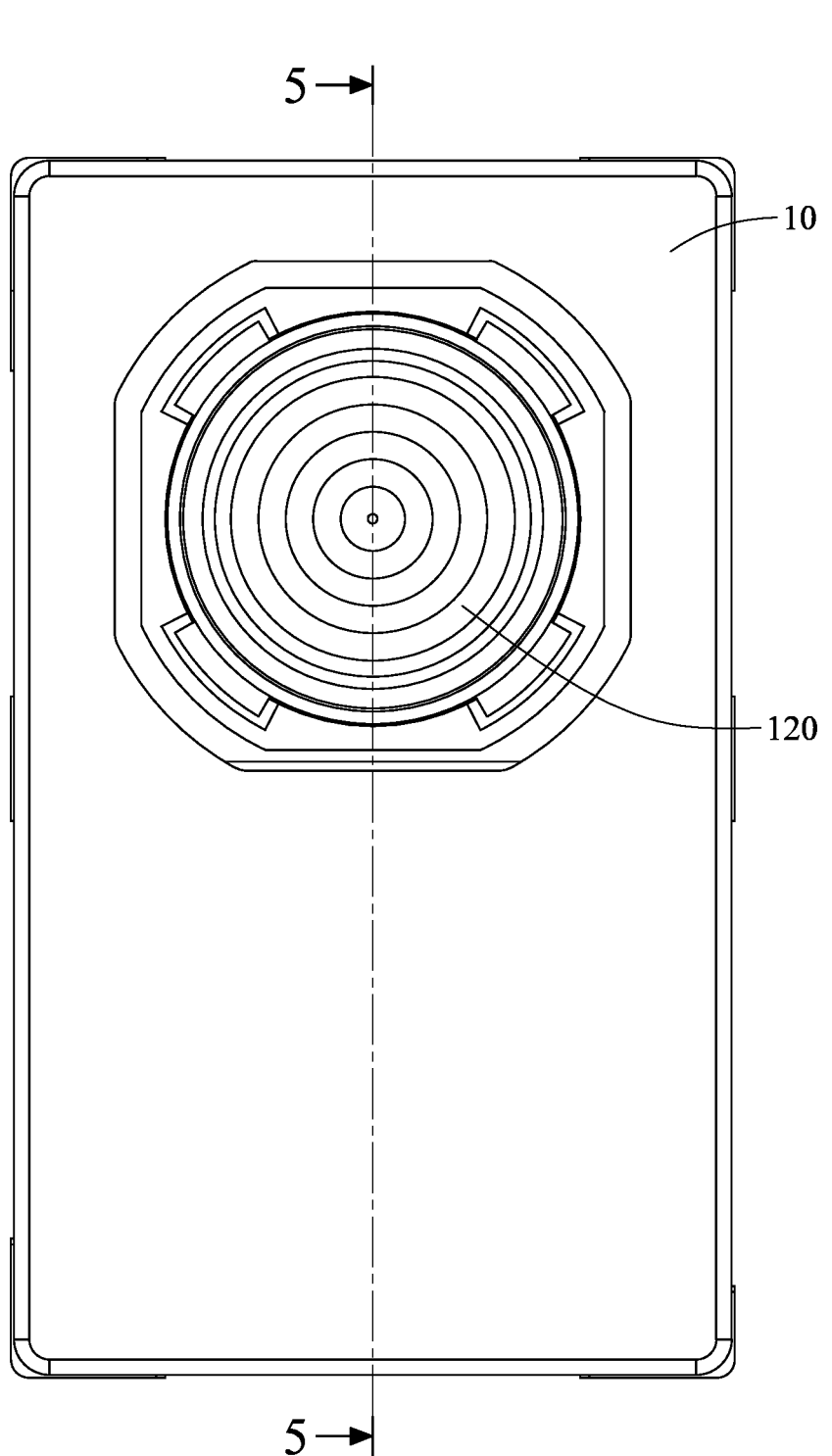
FIG. 4 is a top view of the camera module in FIG. 1.
Figure 5:
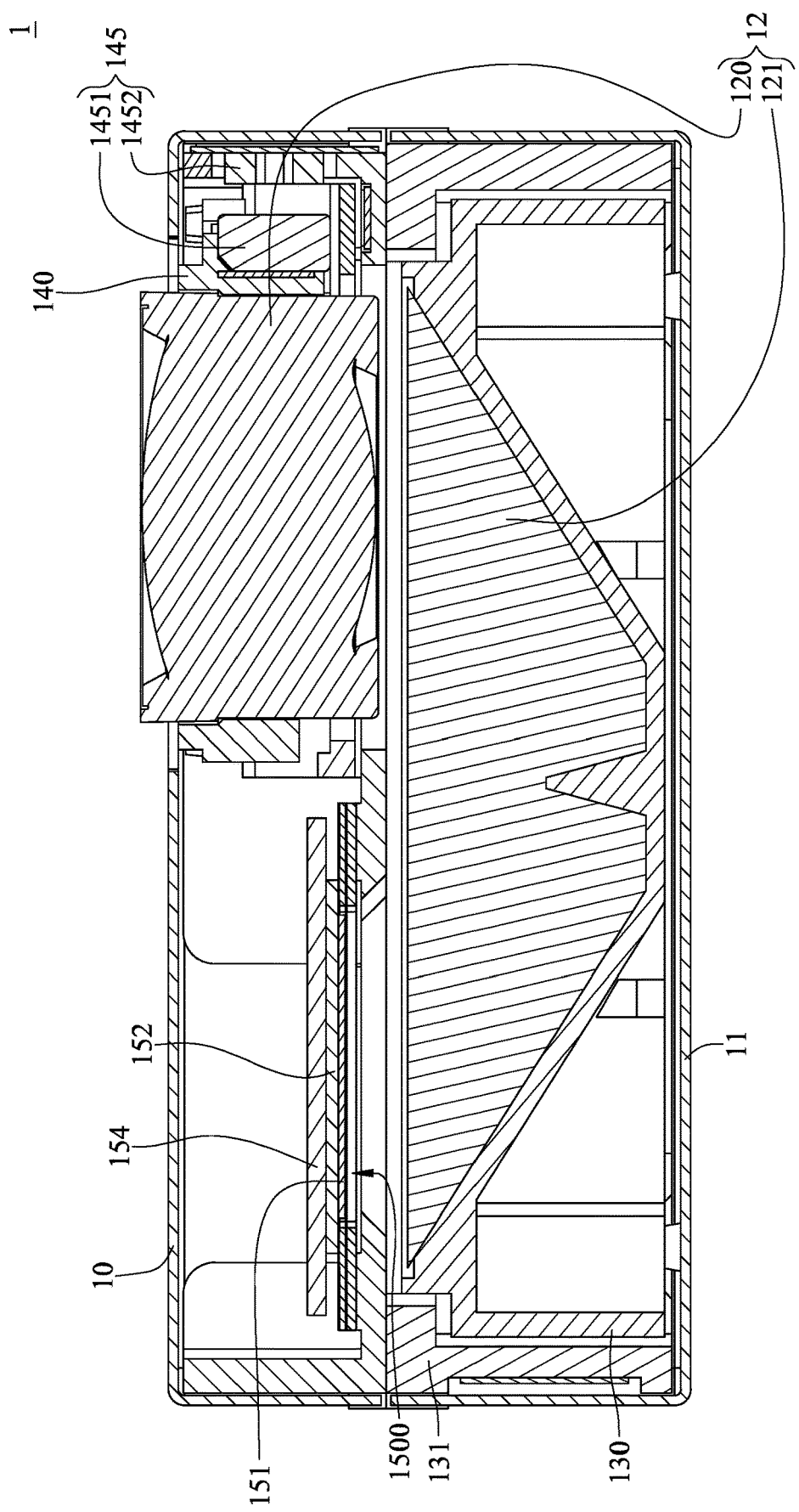
FIG. 5 is a cross-sectional view of the camera module along line 5-5 in FIG. 4.
Figure 6:
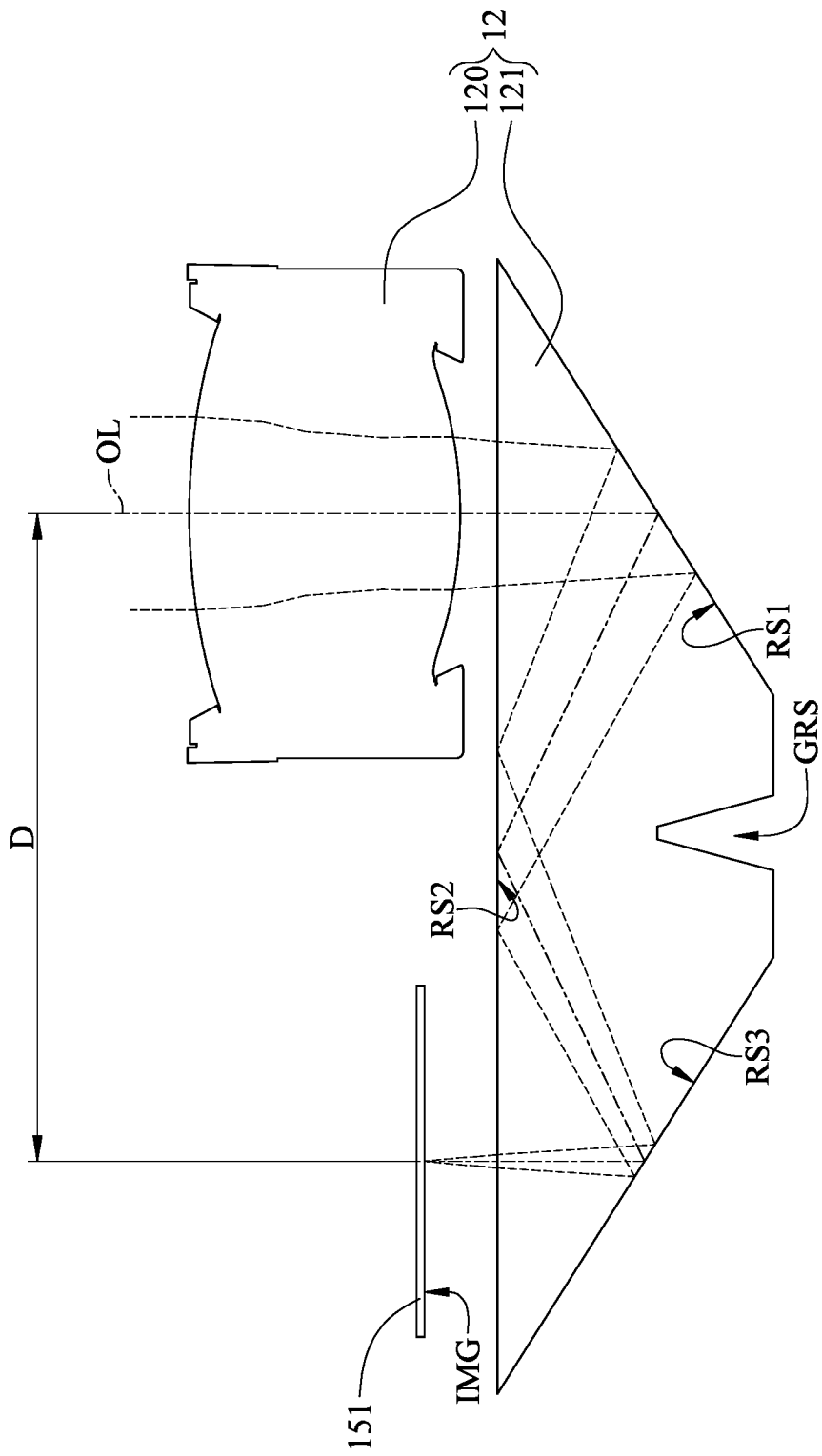
FIG. 6 is a schematic view of an imaging lens, a plastic light-folding element and an image sensor in FIG. 5 and tracks of imaging light rays.
Figure 7:
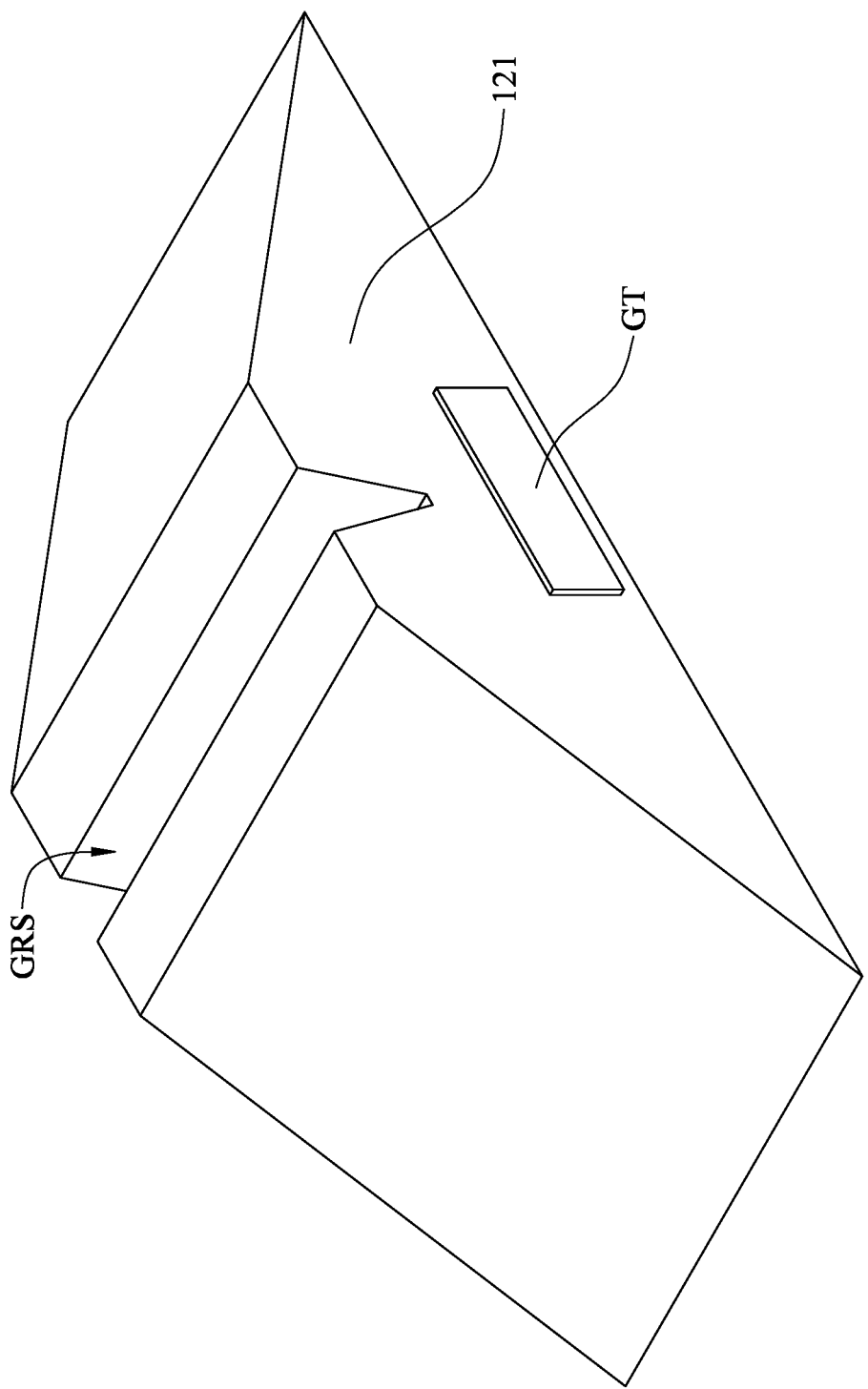
FIG. 7 is a perspective view of the plastic light-folding element in FIG. 5.
Figure 8:
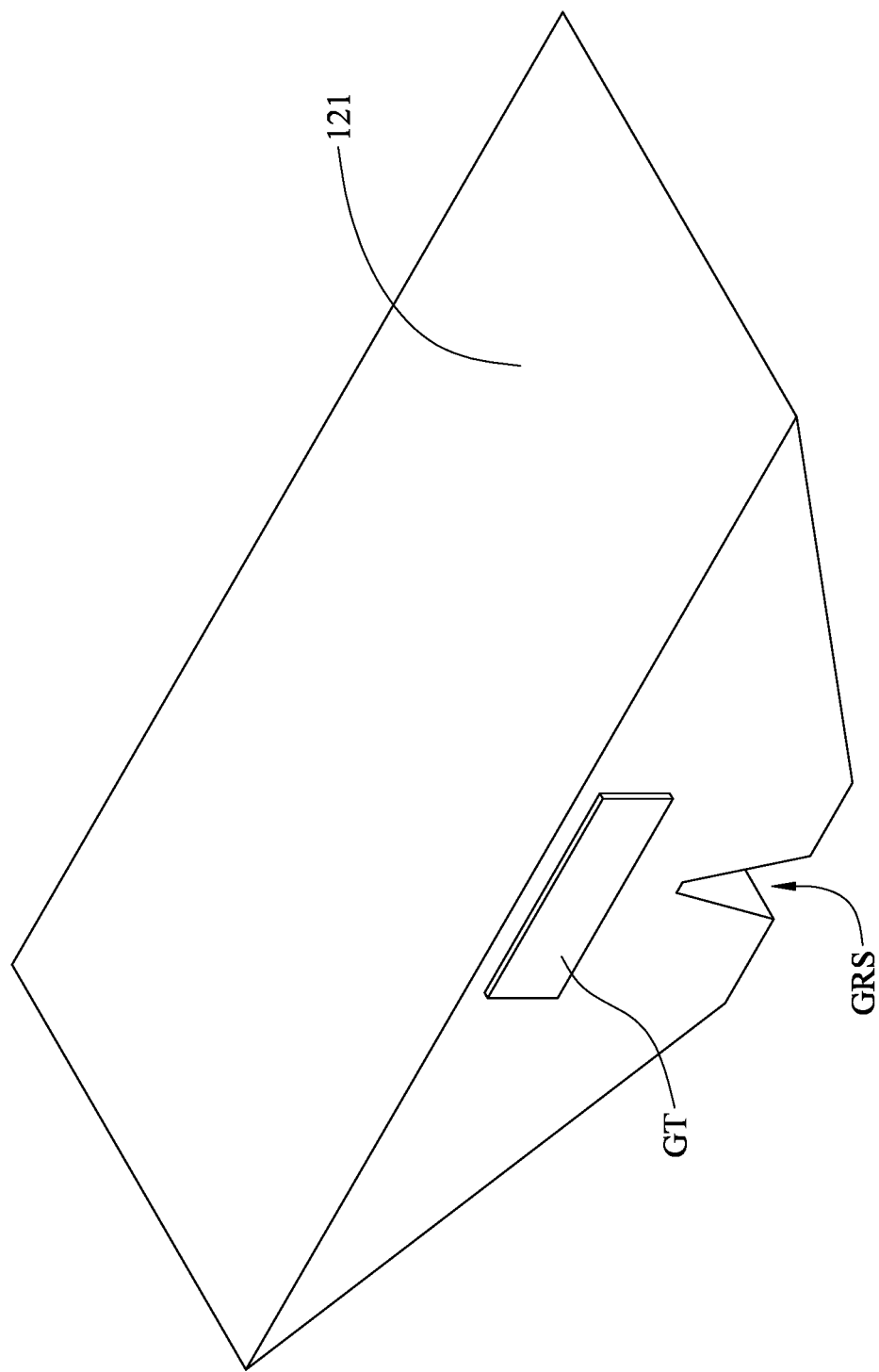
FIG. 8 is another perspective view of the plastic light-folding element in FIG. 5.
Figure 9:
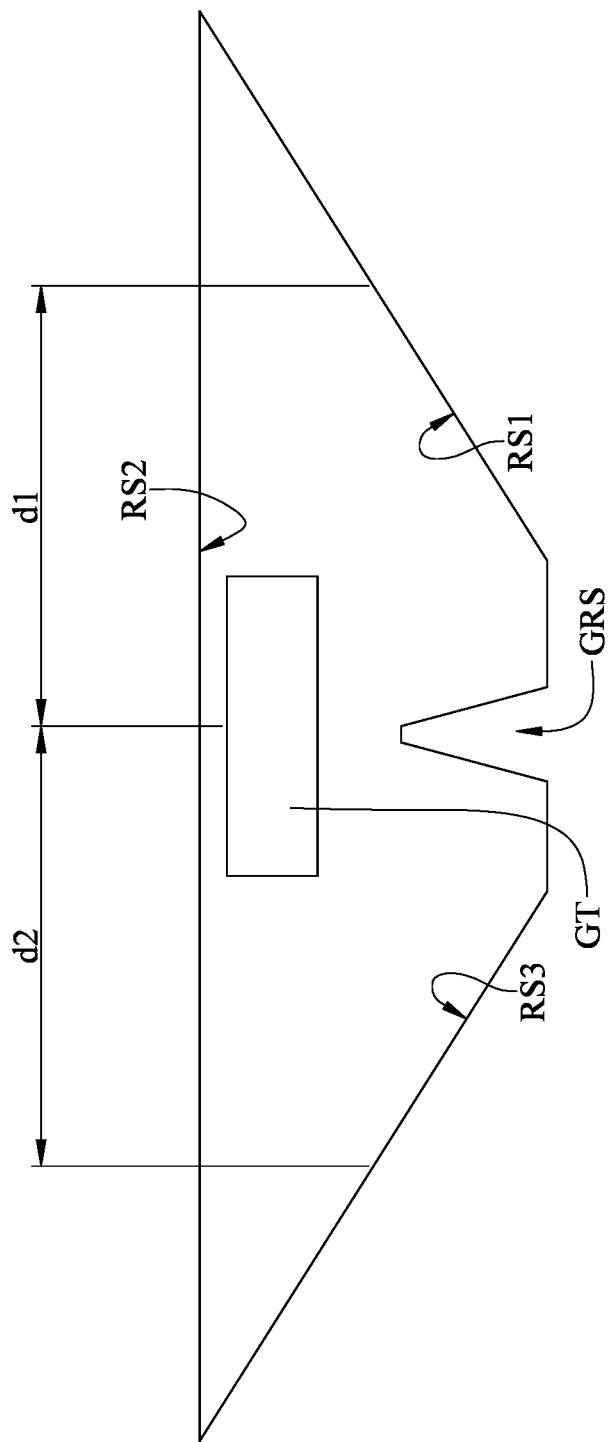
FIG. 9 is a side view of the plastic light-folding element in FIG. 5.
Figure 10:
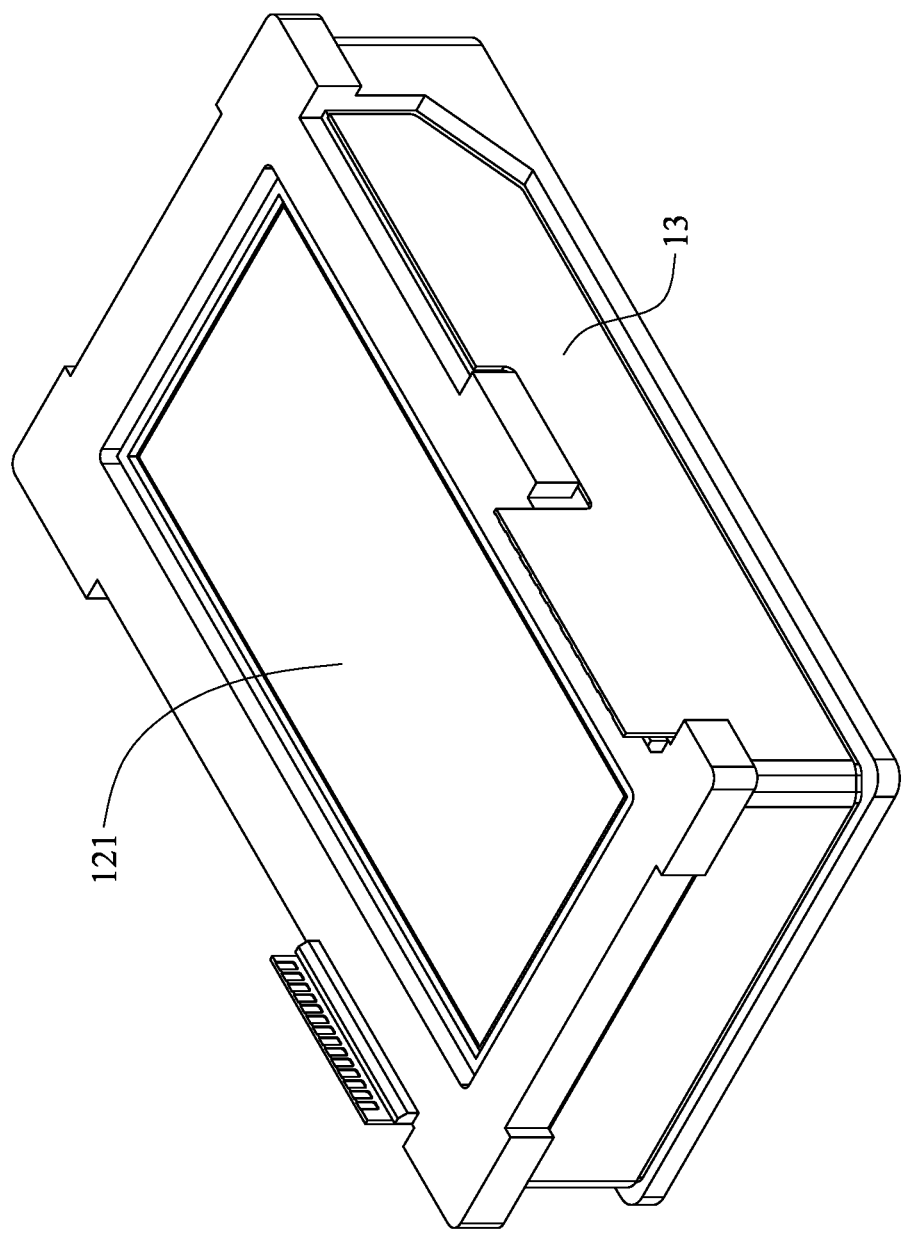
FIG. 10 is a perspective view of the plastic light-folding element and a driving module of the camera module in FIG. 1.
Figure 11:
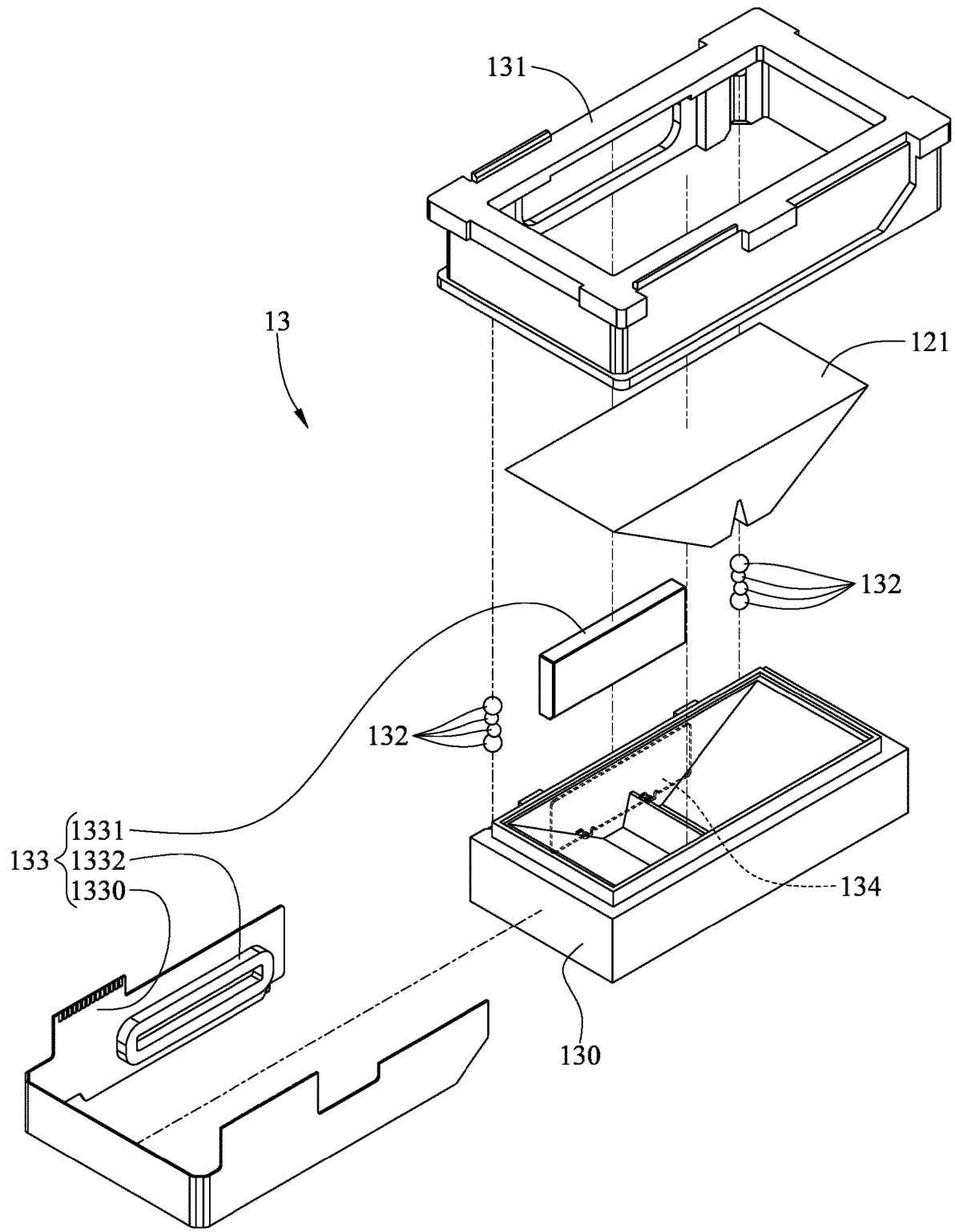
FIG. 11 is an exploded view of the driving module and the plastic light-folding element in FIG. 10.
Figure 12:
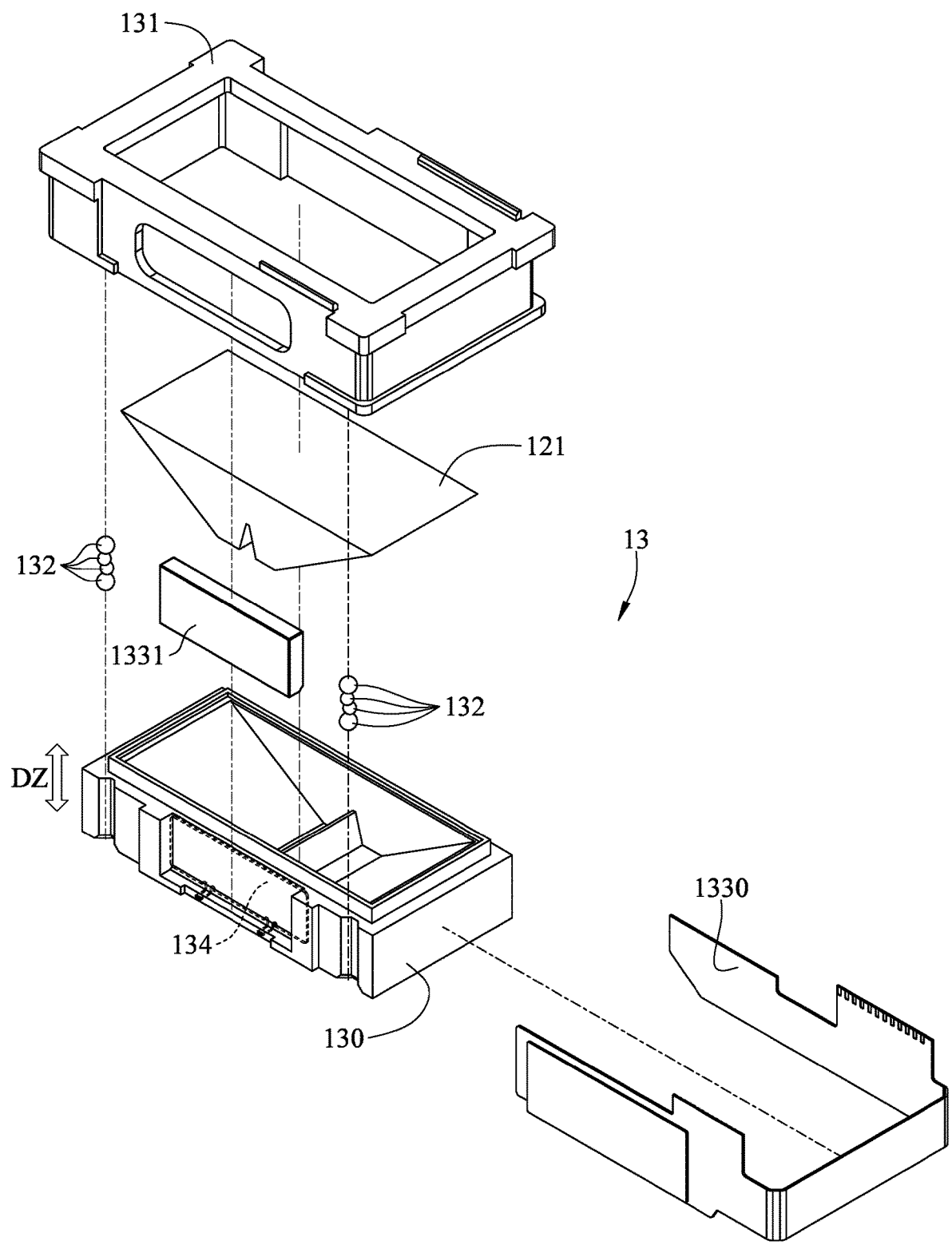
FIG. 12 is another exploded view of the driving module and the plastic light-folding element in FIG. 10.
Figure 13:
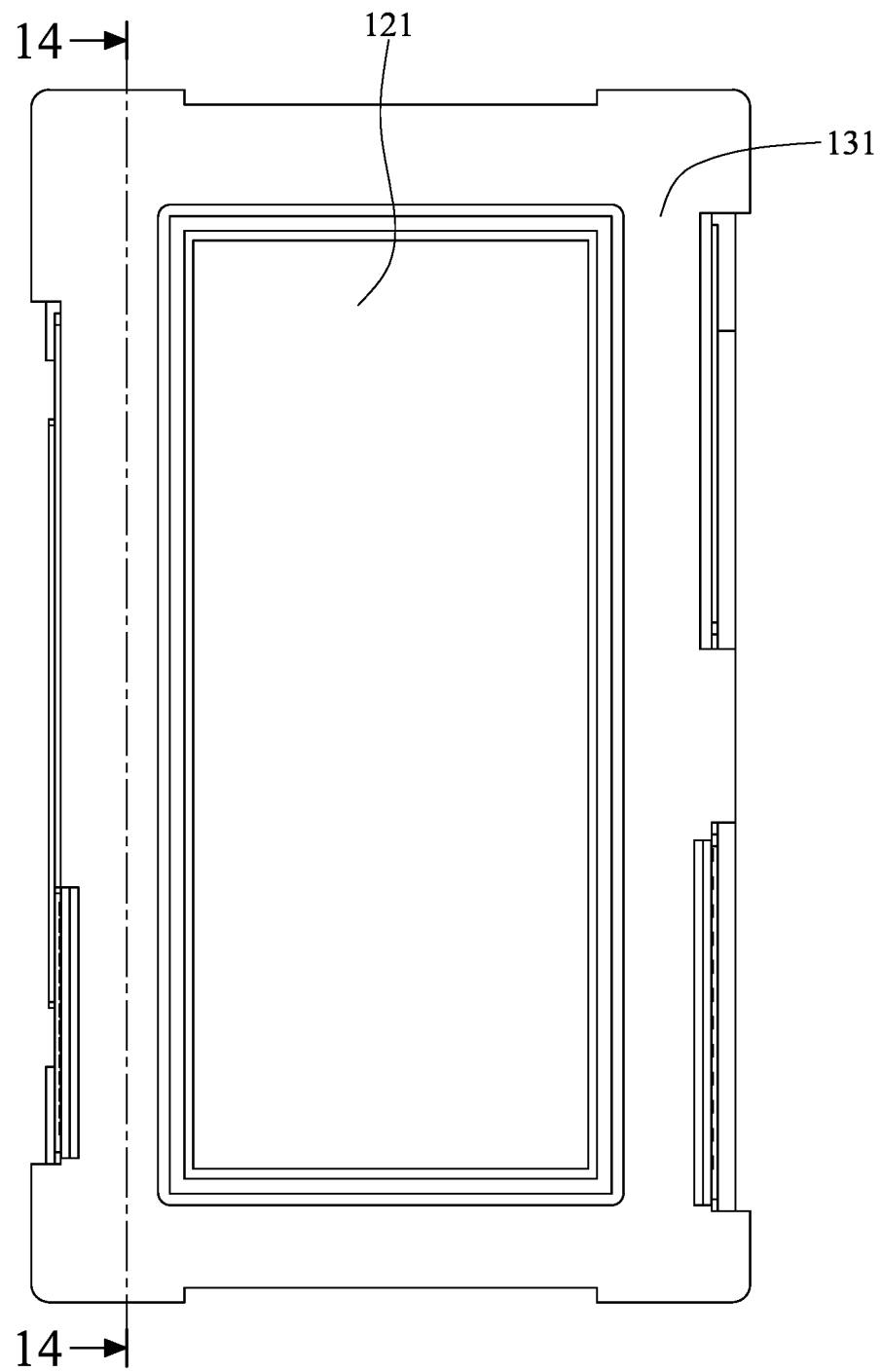
FIG. 13 is a top view of the driving module and the plastic light-folding element in FIG. 10.
Figure 14:
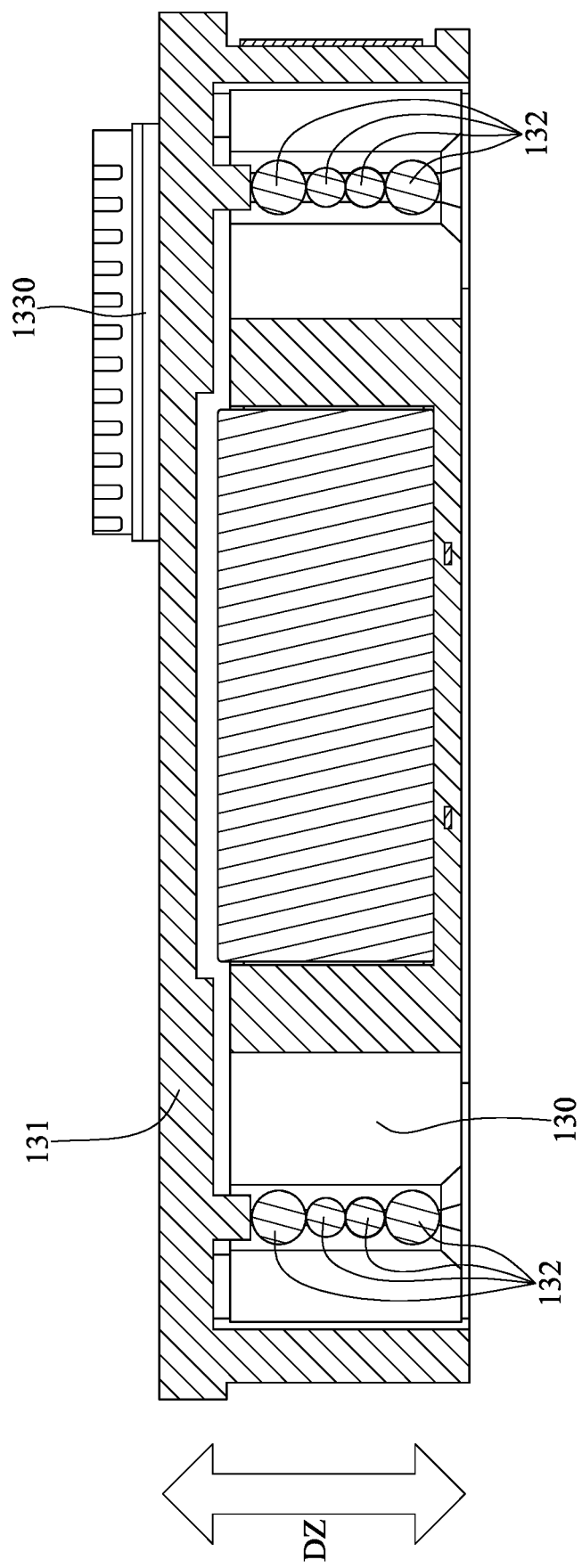
FIG. 14 is a cross-sectional view of the driving module and the plastic light-folding element along line 14-14 in FIG. 13.
Figure 15:
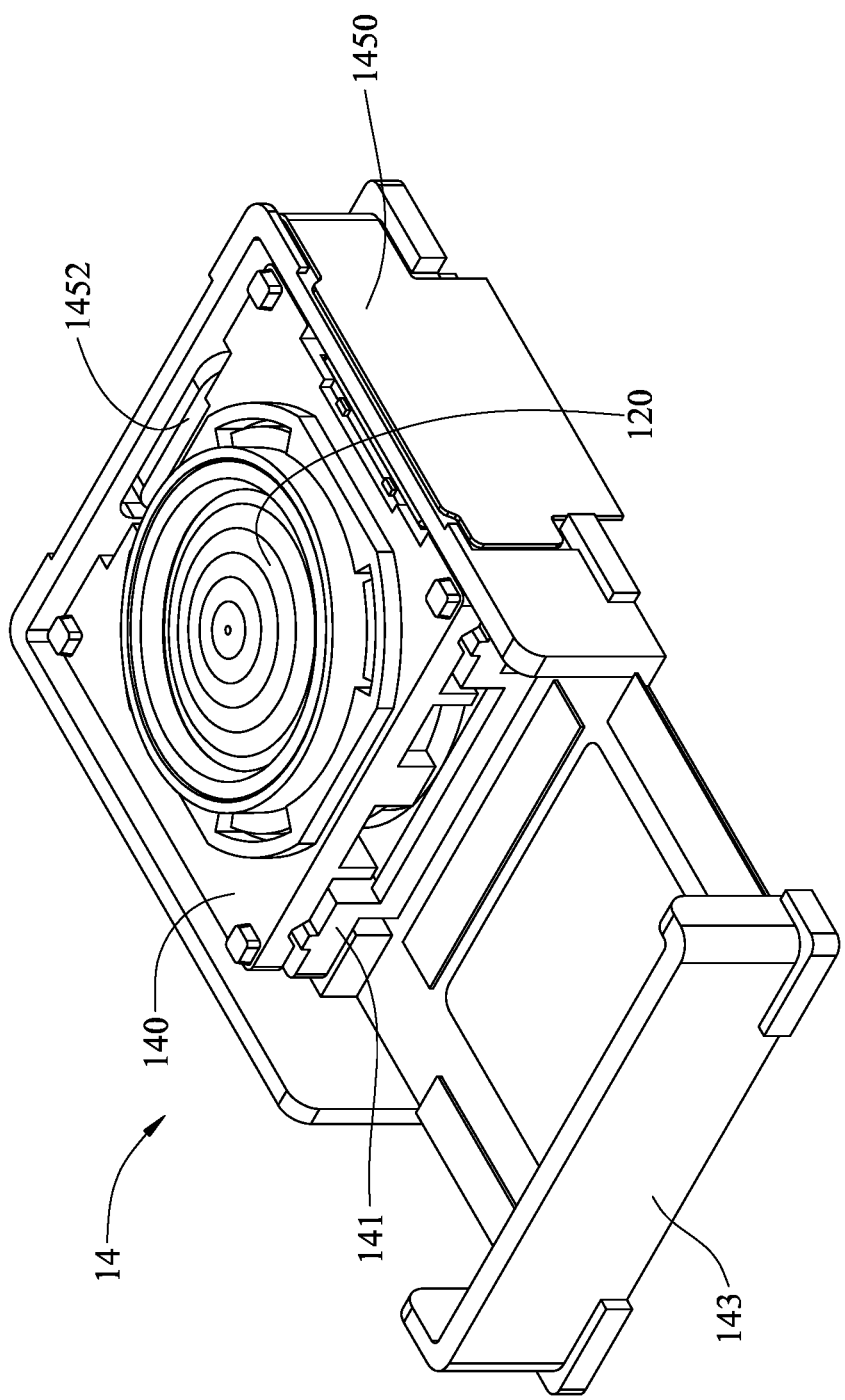
FIG. 15 is a perspective view of the imaging lens and an image stabilization module of the camera module in FIG. 1.
Figure 16:
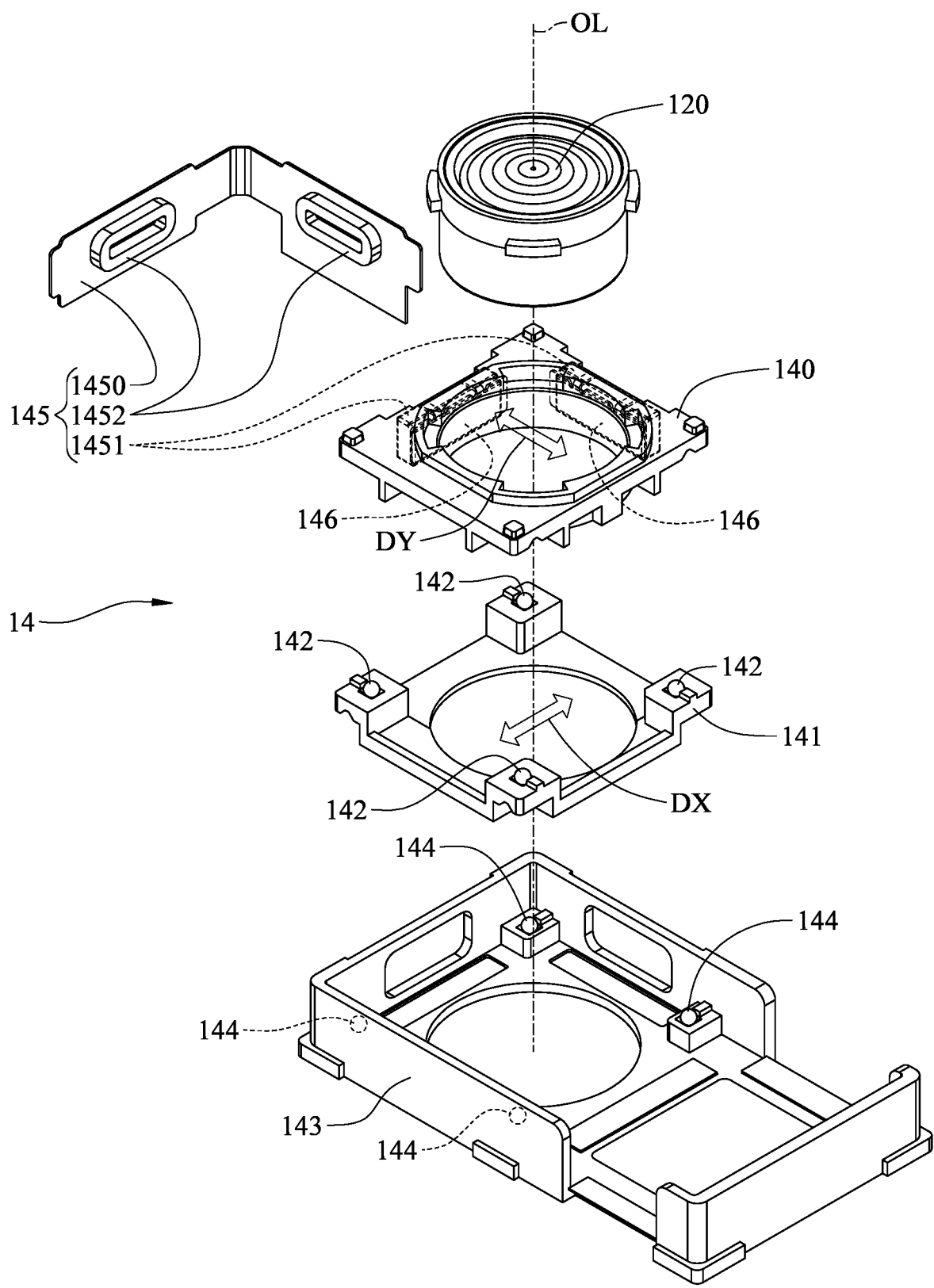
FIG. 16 is an exploded view of the image stabilization module and the imaging lens in FIG. 15.
Figure 17:
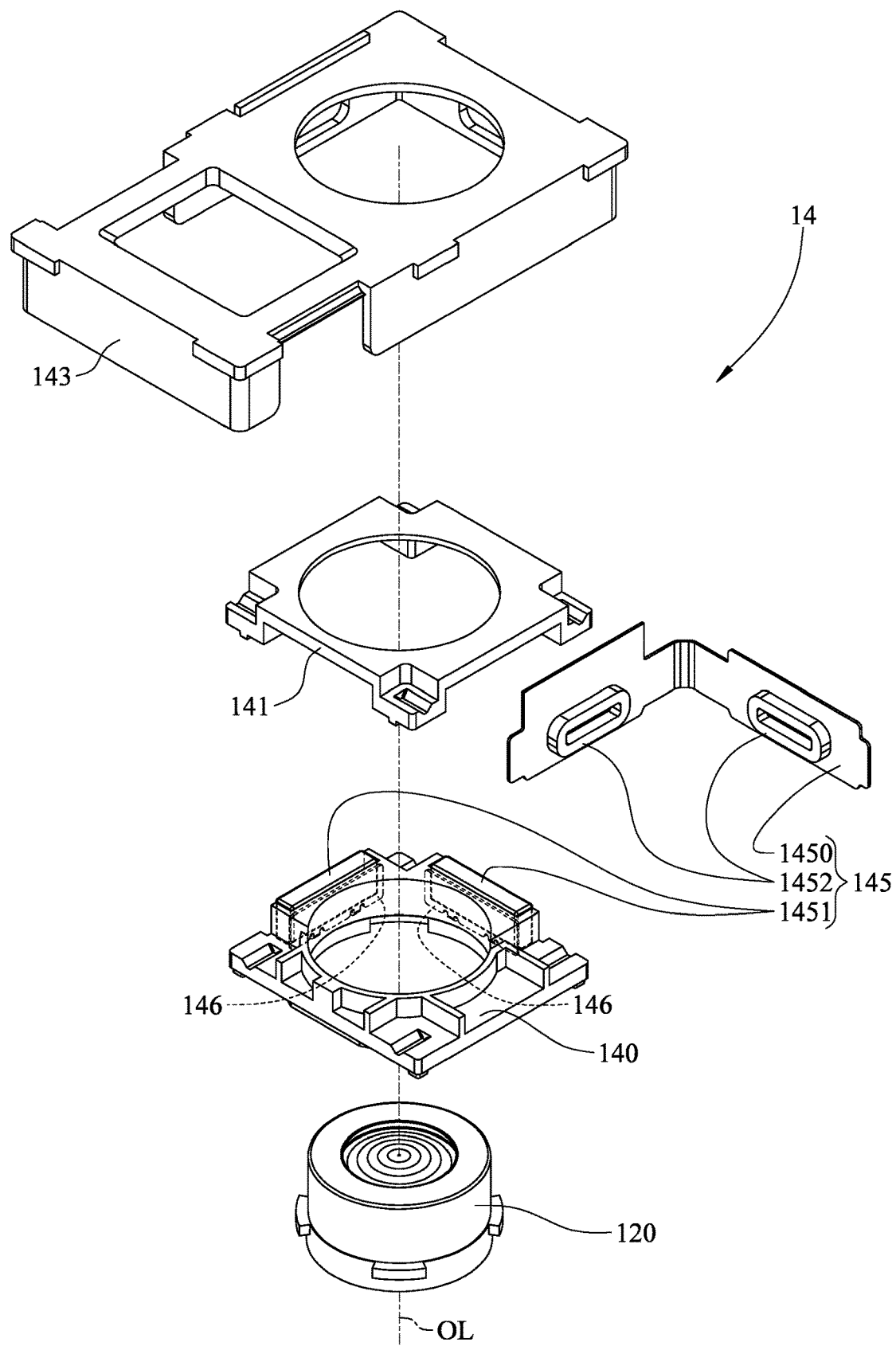
FIG. 17 is another exploded view of the image stabilization module and the imaging lens in FIG. 15.
Figure 18:
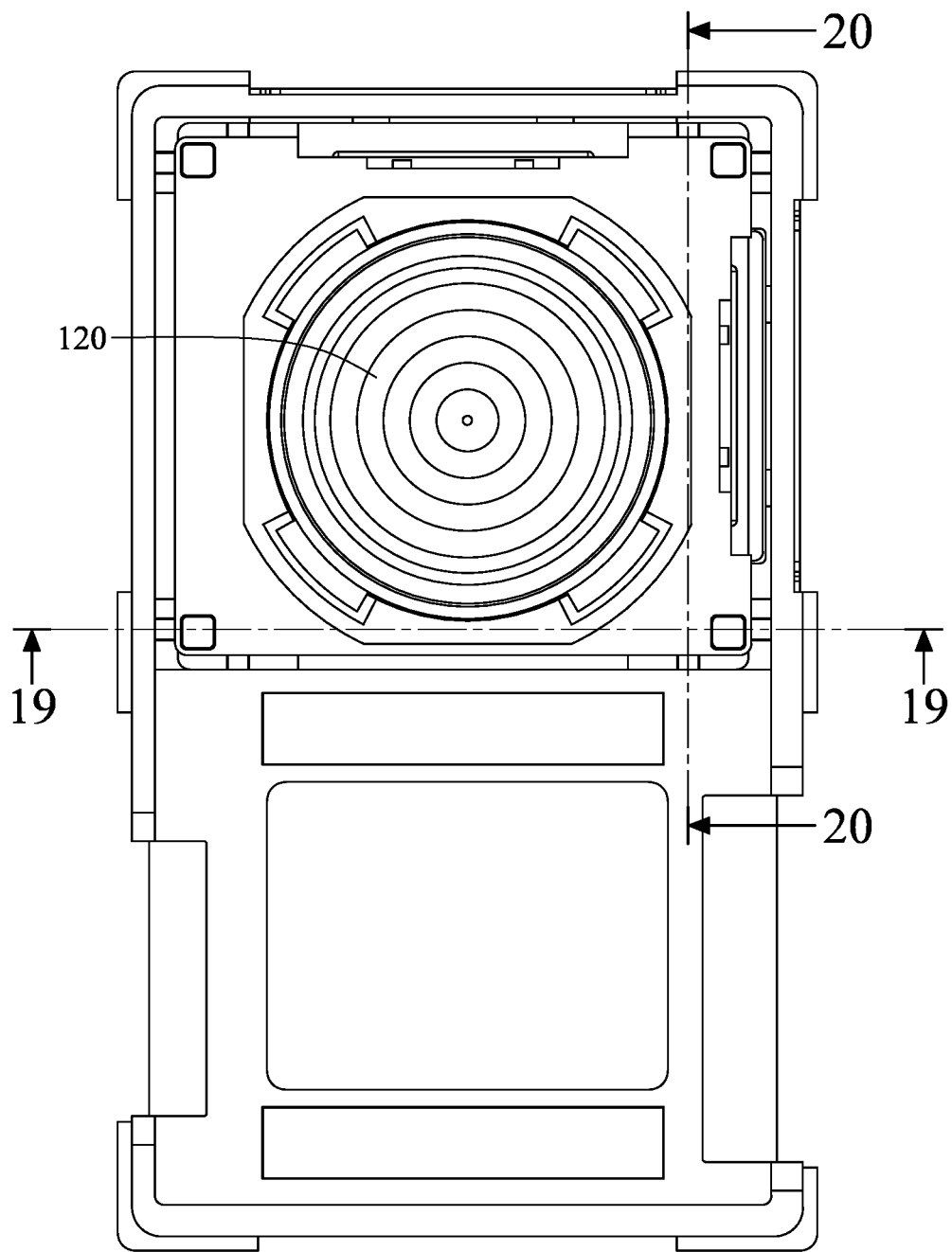
FIG. 18 is a top view of the image stabilization module and the imaging lens in FIG. 15.
Figure 19:
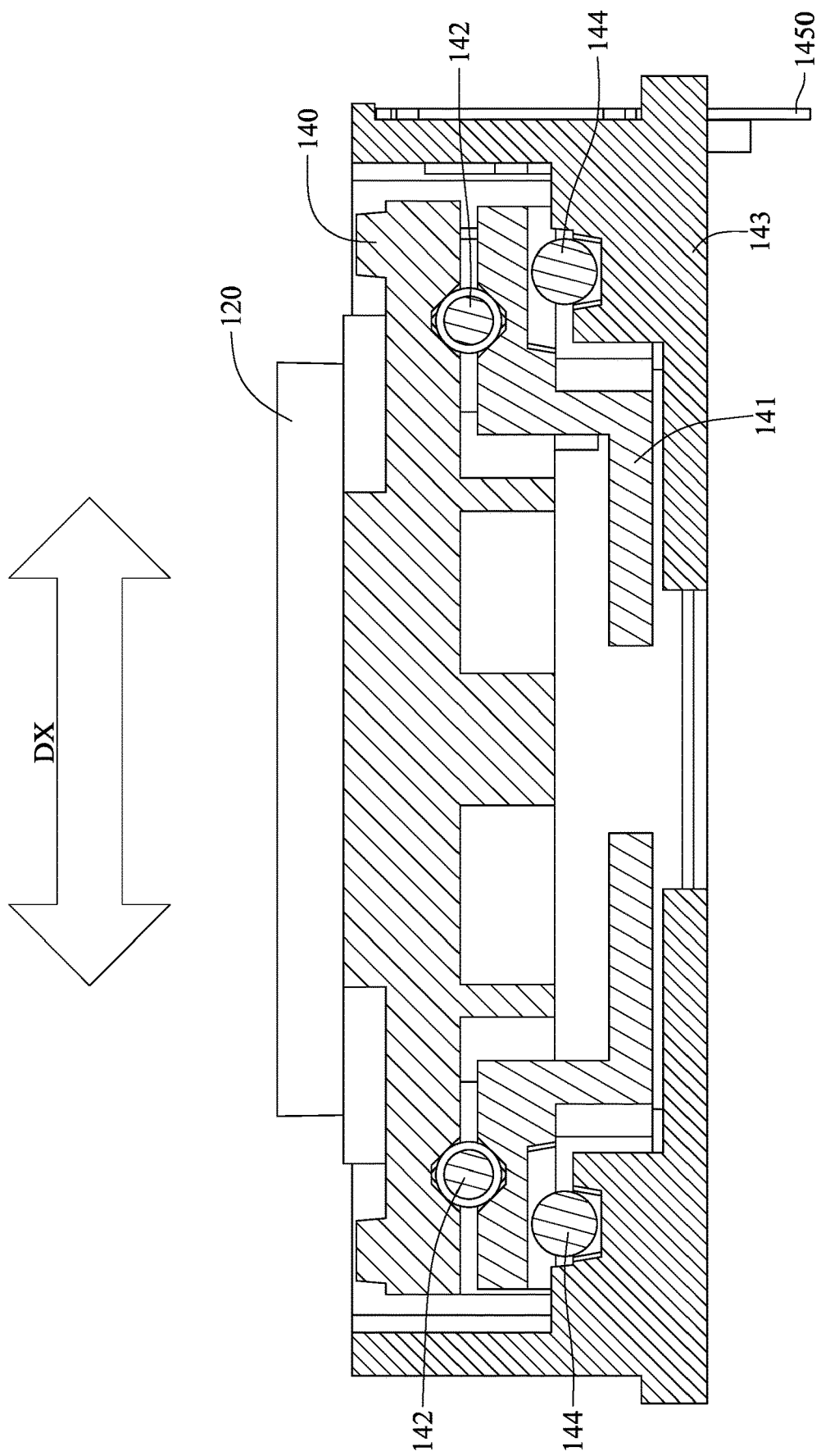
FIG. 19 is a cross-sectional view of the image stabilization module and the imaging lens along line 19-19 in FIG. 18.
Figure 20:
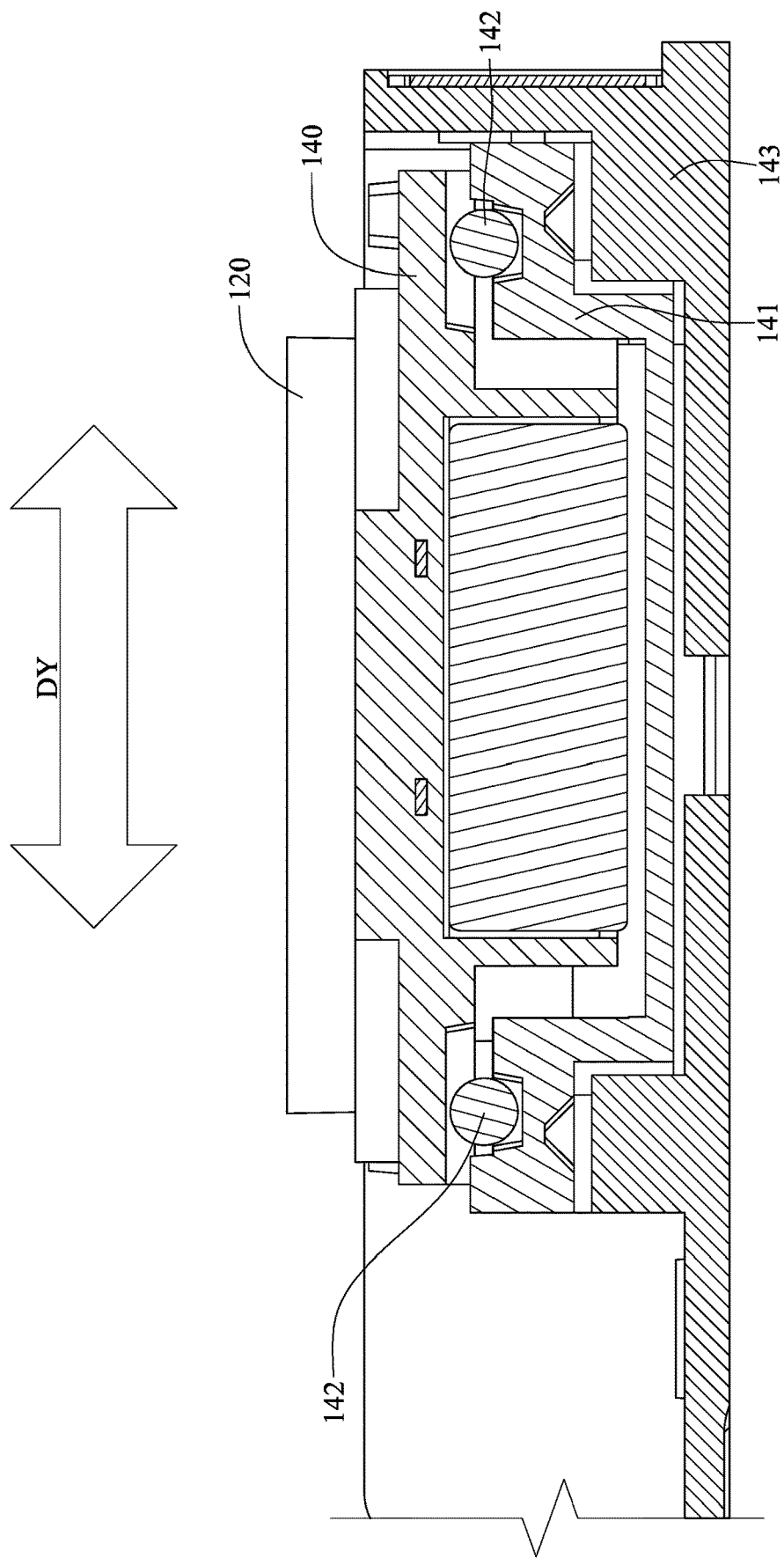
FIG. 20 is a cross-sectional view of the image stabilization module and the imaging lens along line 20-20 in FIG. 18.
Figure 21:
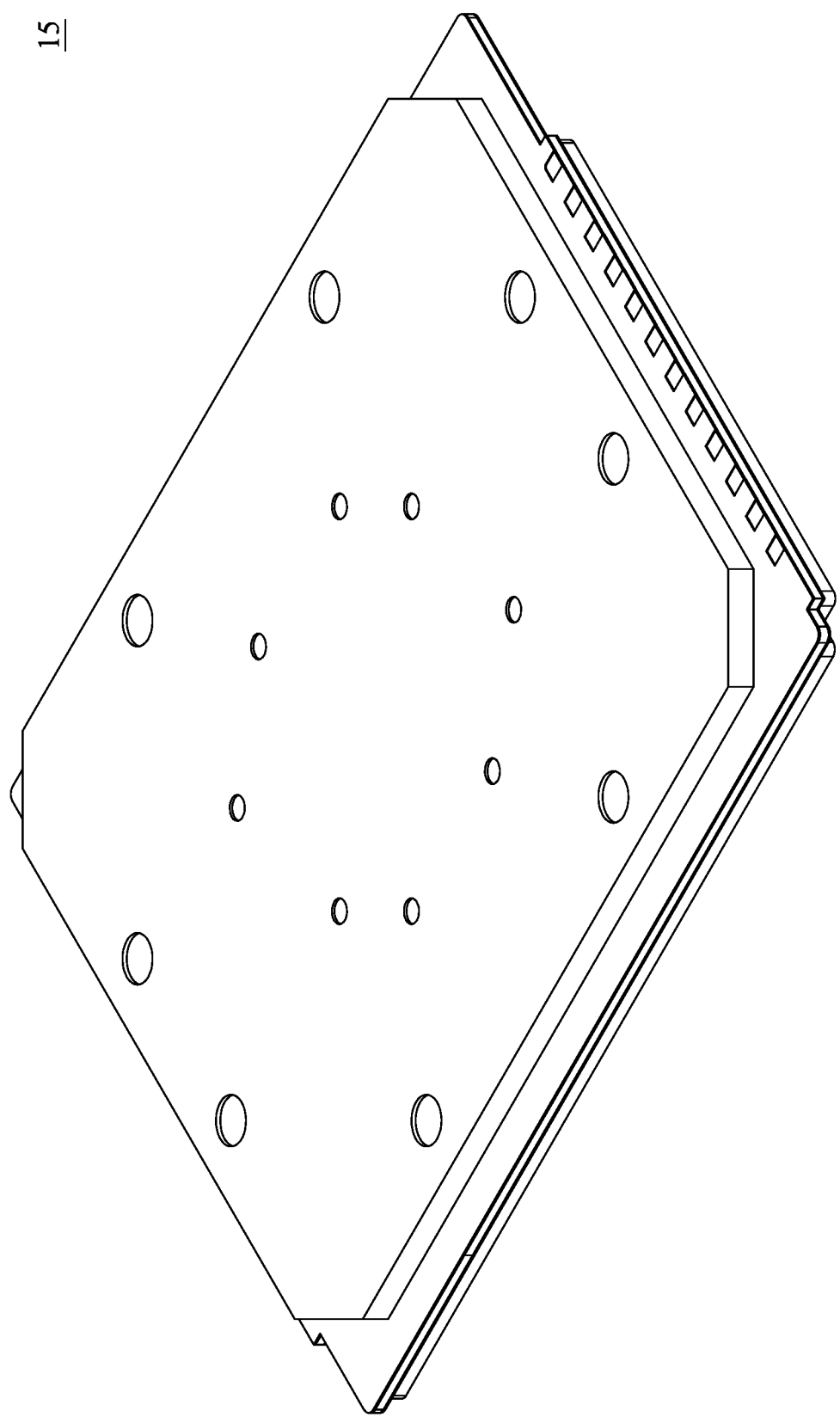
FIG. 21 is a perspective view of an image sensor module of the camera module in FIG. 1.
Figure 22:
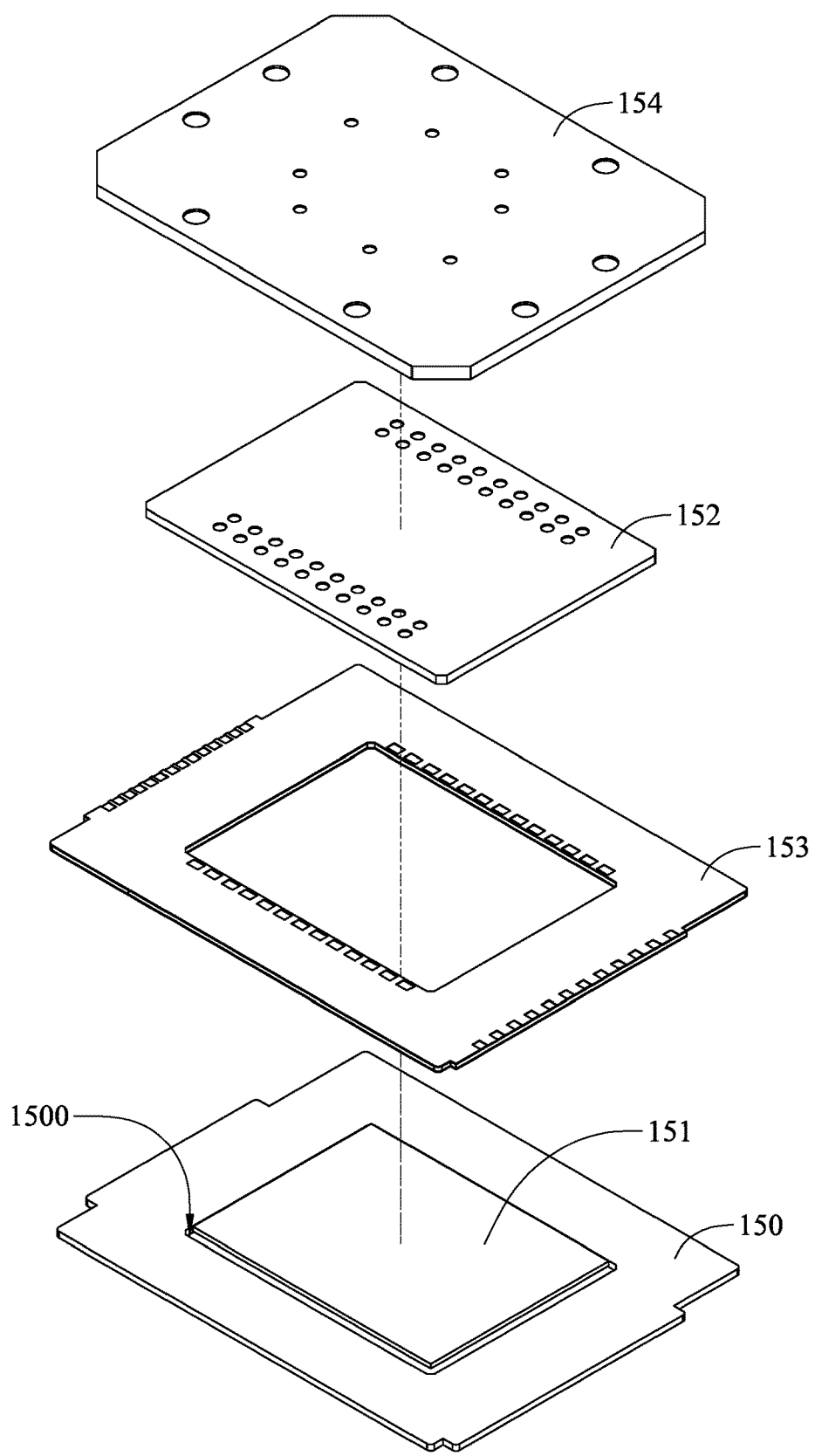
FIG. 22 is an exploded view of the image sensor module in FIG. 21.

FIG. 1 is a perspective view of a camera module according to the 1st embodiment of the present disclosure, FIG. 2 is an exploded view of the camera module in FIG. 1, FIG. 3 is another exploded view of the camera module in FIG. 1, FIG. 4 is a top view of the camera module in FIG. 1, FIG. 5 is a cross-sectional view of the camera module along line 5-5 in FIG. 4, FIG. 6 is a schematic view of an imaging lens, a plastic light-folding element and an image sensor in FIG. 5 and tracks of imaging light rays, FIG. 7 is a perspective view of the plastic light-folding element in FIG. 5, FIG. 8 is another perspective view of the plastic light-folding element in FIG. 5, FIG. 9 is a side view of the plastic light-folding element in FIG. 5, FIG. 10 is a perspective view of the plastic light-folding element and a driving module of the camera module in FIG. 1, FIG. 11 is an exploded view of the driving module and the plastic light-folding element in FIG. 10, FIG. 12 is another exploded view of the driving module and the plastic light-folding element in FIG. 10, FIG. 13 is a top view of the driving module and the plastic light-folding element in FIG. 10, FIG. 14 is a cross-sectional view of the driving module and the plastic light-folding element along line 14-14 in FIG. 13, FIG. is a perspective view of the imaging lens and an image stabilization module of the camera module in FIG. 1, FIG. 16 is an exploded view of the image stabilization module and the imaging lens in FIG. 15, FIG. 17 is another exploded view of the image stabilization module and the imaging lens in FIG. 15, FIG. 18 is a top view of the image stabilization module and the imaging lens in FIG. 15, FIG. 19 is a cross-sectional view of the image stabilization module and the imaging lens along line 19-19 in FIG. 18, FIG. 20 is a cross-sectional view of the image stabilization module and the imaging lens along line 20-20 in FIG. 18, FIG. 21 is a perspective view of an image sensor module of the camera module in FIG. 1, and FIG. 22 is an exploded view of the image sensor module in FIG. 21.

In this embodiment, a camera module 1 includes a casing 10, a base 11, an imaging lens module 12, a driving module 13, an image stabilization module 14 and an image sensor module 15.

The casing 10 has an opening 100. The base 11 and the casing 10 are coupled with each other and together form an accommodation space S.

The imaging lens module 12 is disposed in the accommodation space S, and the imaging lens module 12 includes an imaging lens 120 and a plastic light-folding element 121.

The imaging lens 120 is disposed corresponding to the opening 100 of the casing 10, and an optical axis OL of the imaging lens 120 passes through the opening 100 of the casing 10. More specifically, the imaging lens 120 is exposed to the outside by the opening 100 of the casing 10 so as to be visible to users. The plastic light-folding element 121 is located on the optical axis OL, and the plastic light-folding element 121 is located on an image side of the imaging lens 120.

The plastic light-folding element 121 is a prism made by an injection molding process, and an Abbe number of the plastic light-folding element 121 is larger than or equal to 35 and smaller than or equal to 65. In addition, the plastic light-folding element 121 has three reflection surfaces RS1, RS2 and RS3, a gate trace GT and a recessed structure GRS. The recessed structure GRS of the plastic light-folding element 121 extends and tapers off from the outer surface of the plastic light-folding element 121 toward the gate trace GT.

The plastic light-folding element 121 is configured to fold the optical axis OL three times. In specific, as shown in FIG. 5 and FIG. 6, the three reflection surfaces RS1, RS2 and RS3 of the plastic light-folding element 121 are configured to fold the optical axis OL, and an imaging light travelling along the optical axis OL in the plastic light-folding element 121 can be totally reflected at the reflection surfaces RS1, RS2 and RS3, respectively, thus undergoing internal reflection three times.

As shown in FIG. 12 and FIG. 14, the driving module 13 is configured to drive the plastic light-folding element 121 to move in a direction DZ parallel to the optical axis OL. In specific, the driving module 13 includes a first holder 130, a fixed frame 131, a plurality of first rollable supports 132, a first driving mechanism 133 and a first ferromagnetic element 134. The first holder 130 holds the plastic light-folding element 121, and the fixed frame 131 is disposed corresponding to the first holder 130.

The first rollable supports 132 are spherical and disposed between the first holder 130 and the fixed frame 131, and the first rollable supports 132 provide the first holder 130 with a degree of freedom associated with translational motion in a direction parallel to the optical axis OL relative to the fixed frame 131.

The first driving mechanism 133 is configured to drive the first holder 130 to move relative to the fixed frame 131. In specific, the first driving mechanism 133 includes a first flexible printed circuit board 1330, a first magnet 1331 and a first coil 1332. The first flexible printed circuit board 1330 is attached to the fixed frame 131, the first magnet 1331 is fixed to the first holder 130, and the first coil 1332 is disposed on the first flexible printed circuit board 1330 and corresponds to the first magnet 1331 so as to provide a driving force for driving the first holder 130 to move relative to the fixed frame 131.

The first ferromagnetic element 134 and the first holder 130 are integrally formed by an insert molding process, and the first ferromagnetic element 134 is disposed corresponding to the first magnet 1331 of the first driving mechanism 133.

In this embodiment, as shown in FIG. 16, FIG. 19 and FIG. 20, the image stabilization module 14 is an OIS module configured to drive the imaging lens 120 to move in directions DX and DY perpendicular to the optical axis OL. Furthermore, the image stabilization module 14 includes a second holder 140, a movable plate 141, a plurality of second rollable supports 142, a fixed base 143, a plurality of third rollable supports 144, a second driving mechanism 145 and two second ferromagnetic elements 146.

The second holder 140 holds the imaging lens 120. The movable plate 141 is disposed corresponding to the second holder 140. The second rollable supports 142 are spherical and disposed between the second holder 140 and the movable plate 141 so as to provide the second holder 140 with a degree of freedom associated with translational motion in a direction perpendicular to the optical axis OL relative to the fixed base 143 (e.g., the direction DY shown in FIG. 16 and FIG. 20).

The fixed base 143 is disposed corresponding to the movable plate 141. The third rollable supports 144 are spherical and disposed between the movable plate 141 and the fixed base 143 so as to provide the second holder 140 with a degree of freedom associated with translational motion in another direction perpendicular to the optical axis OL relative to the fixed base 143 (e.g., the direction DX shown in FIG. 16 and FIG. 19).

The second driving mechanism 145 is configured to drive the second holder 140 to move relative to the fixed base 143. In specific, the second driving mechanism 145 includes a second flexible printed circuit board 1450, two second magnets 1451 and two second coils 1452. The second flexible printed circuit board 1450 is attached to the fixed base 143, the second magnets 1451 is fixed to the second holder 140, and the second coils 1452 are disposed on the second flexible printed circuit board 1450 and respectively correspond to the second magnets 1451 so as to provide a driving force for driving the second holder 140 to move relative to the fixed base 143.

The second ferromagnetic elements 146 and the second holder 140 are integrally formed by an insert molding process, and the second ferromagnetic elements 146 are respectively disposed corresponding to the second magnets 1451.

The image sensor module 15 is disposed on the fixed base 143 of the image stabilization module 14. In detail, the image sensor module 15 includes a carrier plate 150, an image sensor 151, a substrate 152, a flexible printed circuit board 153 and a printed circuit board 154. The carrier plate 150 is disposed on the fixed base 143 of the image stabilization module 14. The flexible printed circuit board 153 is provided on the carrier plate 150. The substrate 152 is provided on and electrically connected to the flexible printed circuit board 153. The printed circuit board 154 is provided on and electrically connected to the substrate 152. The image sensor 151 is disposed on and electrically connected to the substrate 152. Moreover, the carrier plate 150 has an opening 1500 corresponding to the image sensor 151, and thus, imaging light from the plastic light-folding element 121 can pass through the opening 1500 of the carrier plate 150 and reach the image sensor 151. Furthermore, the image sensor 151 is located on an image surface IMG of the imaging lens 120, and the image sensor 151 is configured to convert the imaging light passing through the imaging lens module 12 into image signal(s). Moreover, the imaging lens 120 and the image sensor 151 are located on the same side of the plastic light-folding element 121.

In this embodiment, the imaging lens module 12, the driving module 13, the image stabilization module 14 and the image sensor 151 are disposed in the accommodation space S.

As shown in FIG. 6, when a deviated distance between a center of the imaging lens 120 and a center of the image sensor 151 in a direction perpendicular to the optical axis OL is D, the following condition is satisfied: D=9 mm.

As shown in FIG. 9, the two reflection surfaces RS1 and RS3 of the plastic light-folding element 121 are symmetrically arranged with respect to the gate trace GT as a center. Moreover, when a deviated distance between a center of the gate trace GT and a center of the reflection surface RS1 in a direction perpendicular to the optical axis OL is d1, and a deviated distance between the center of the gate trace GT and a center of the reflection surface RS3 in a direction perpendicular to the optical axis OL is d2, the following condition is satisfied: |d1−d2|<0.085 mm.

2nd Embodiment

Figure 23:
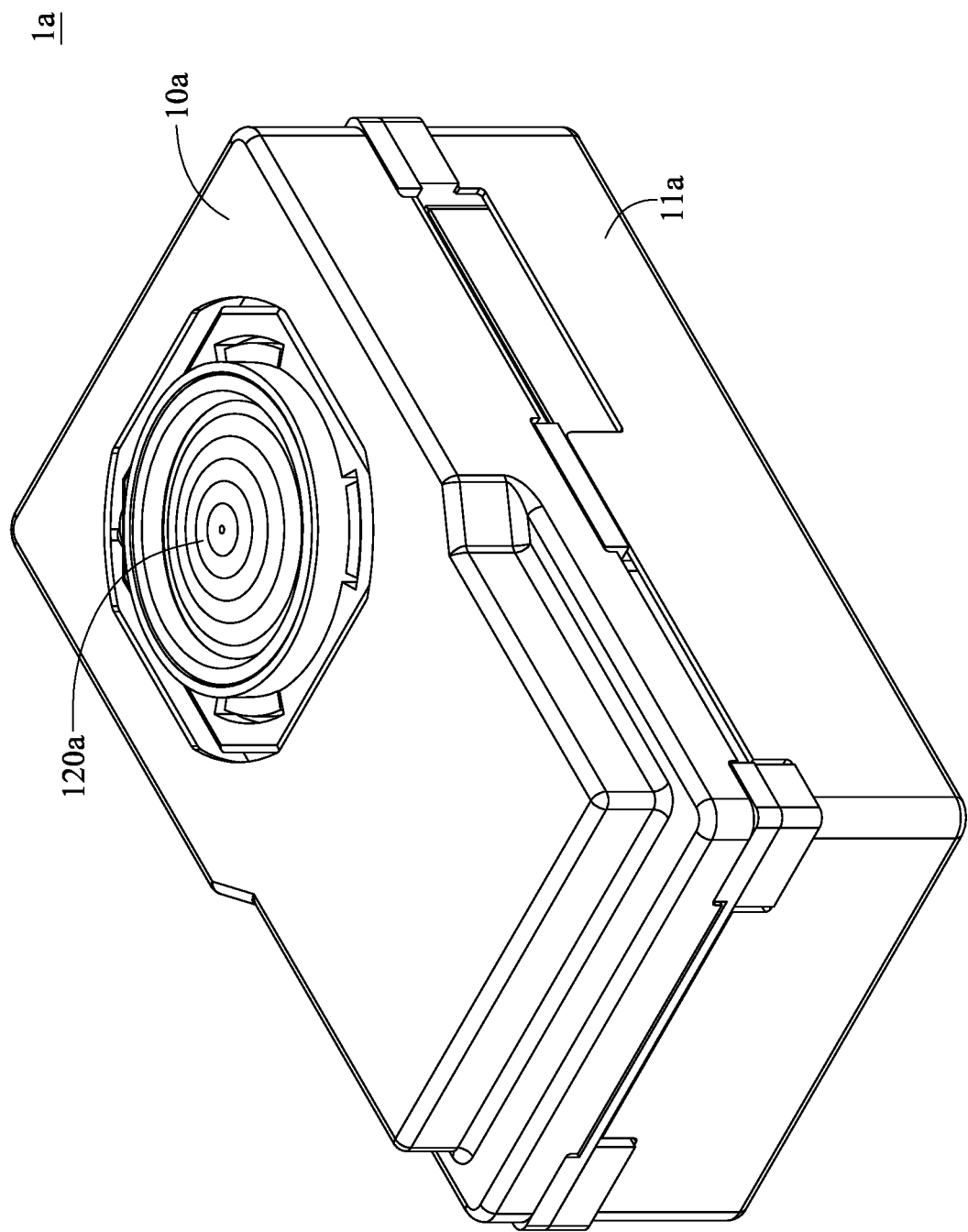
FIG. 23 is a perspective view of a camera module according to the 2nd embodiment of the present disclosure.
Figure 24:
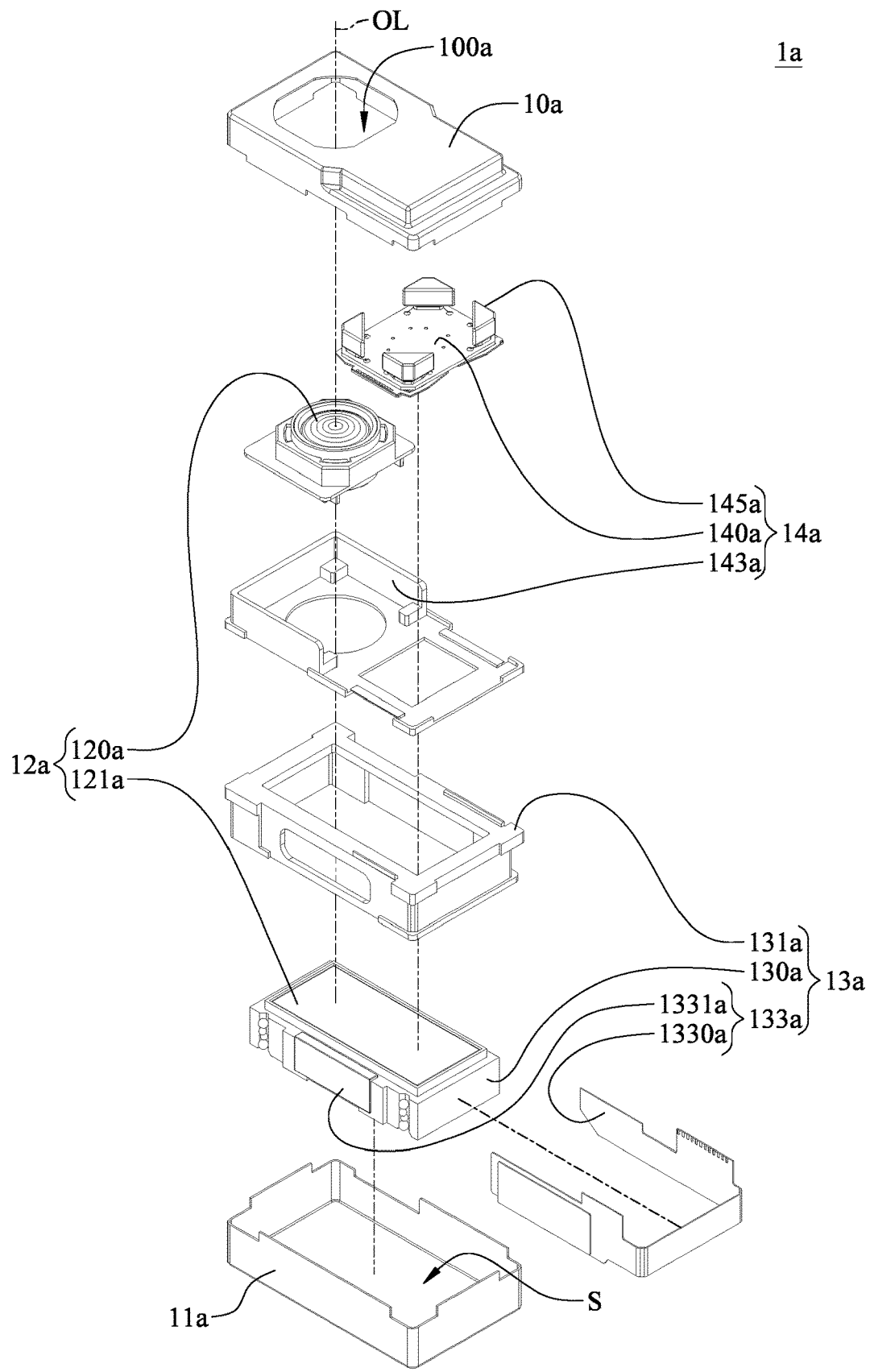
FIG. 24 is an exploded view of the camera module in FIG. 23.
Figure 25:
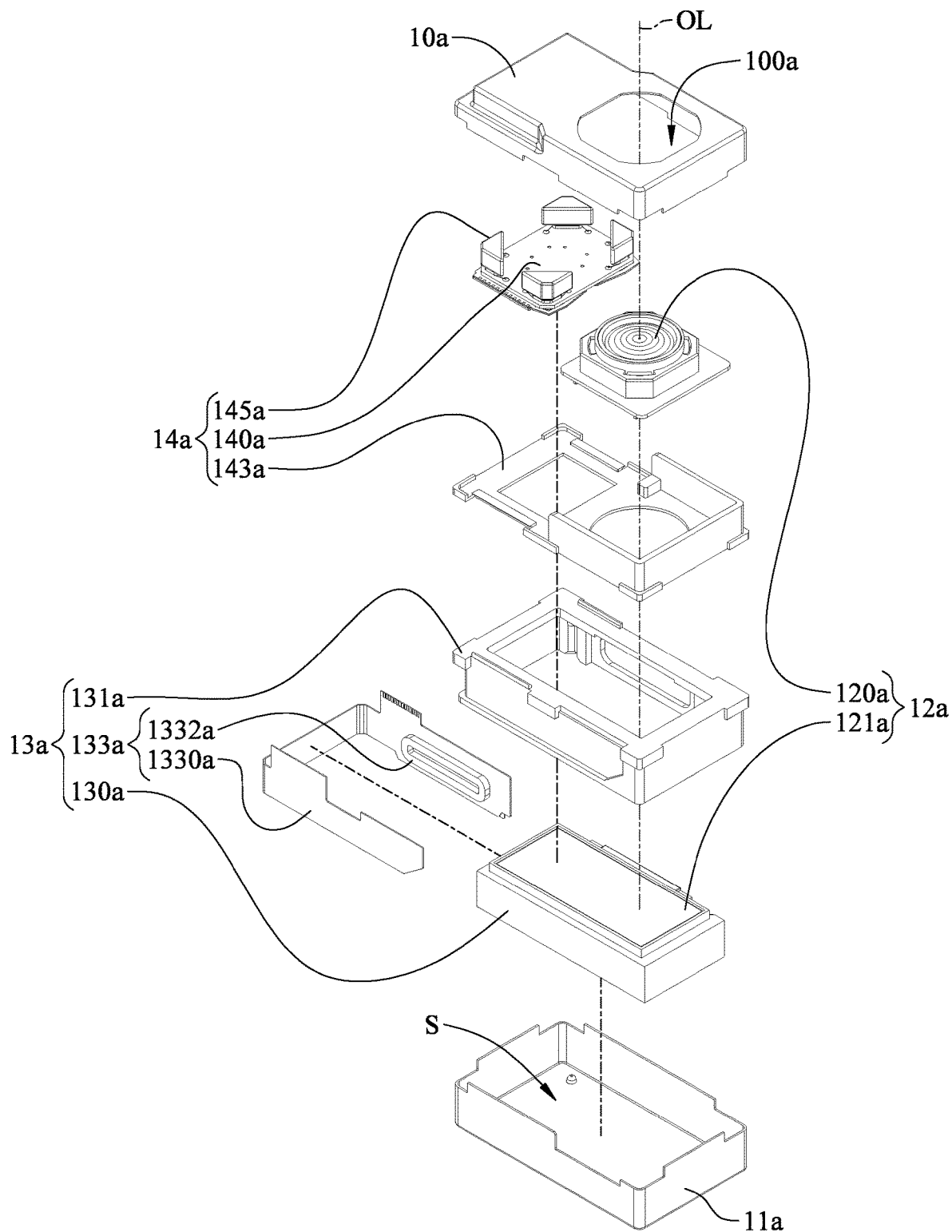
FIG. 25 is another exploded view of the camera module in FIG. 23.
Figure 26:
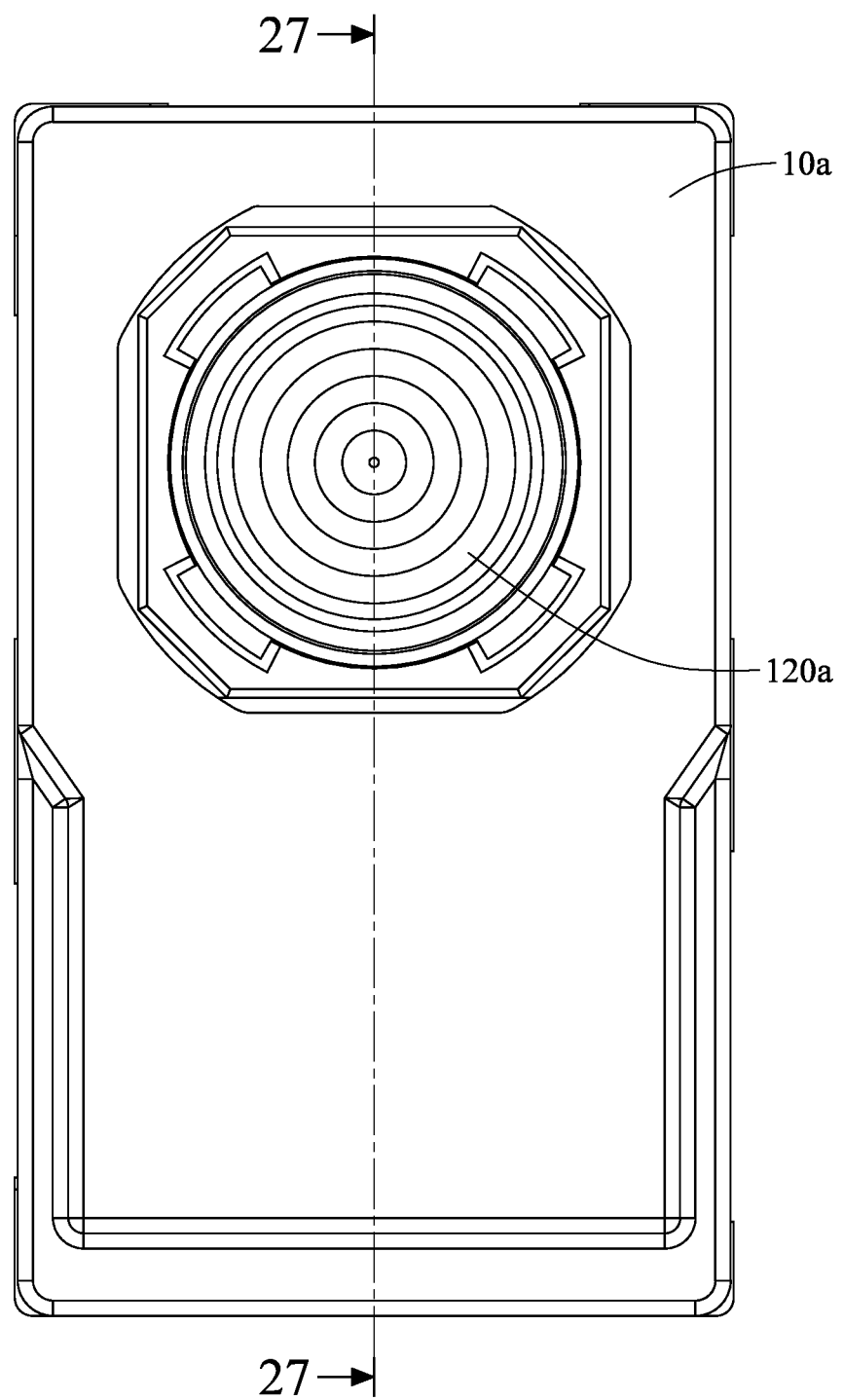
FIG. 26 is a top view of the camera module in FIG. 23.
Figure 27:
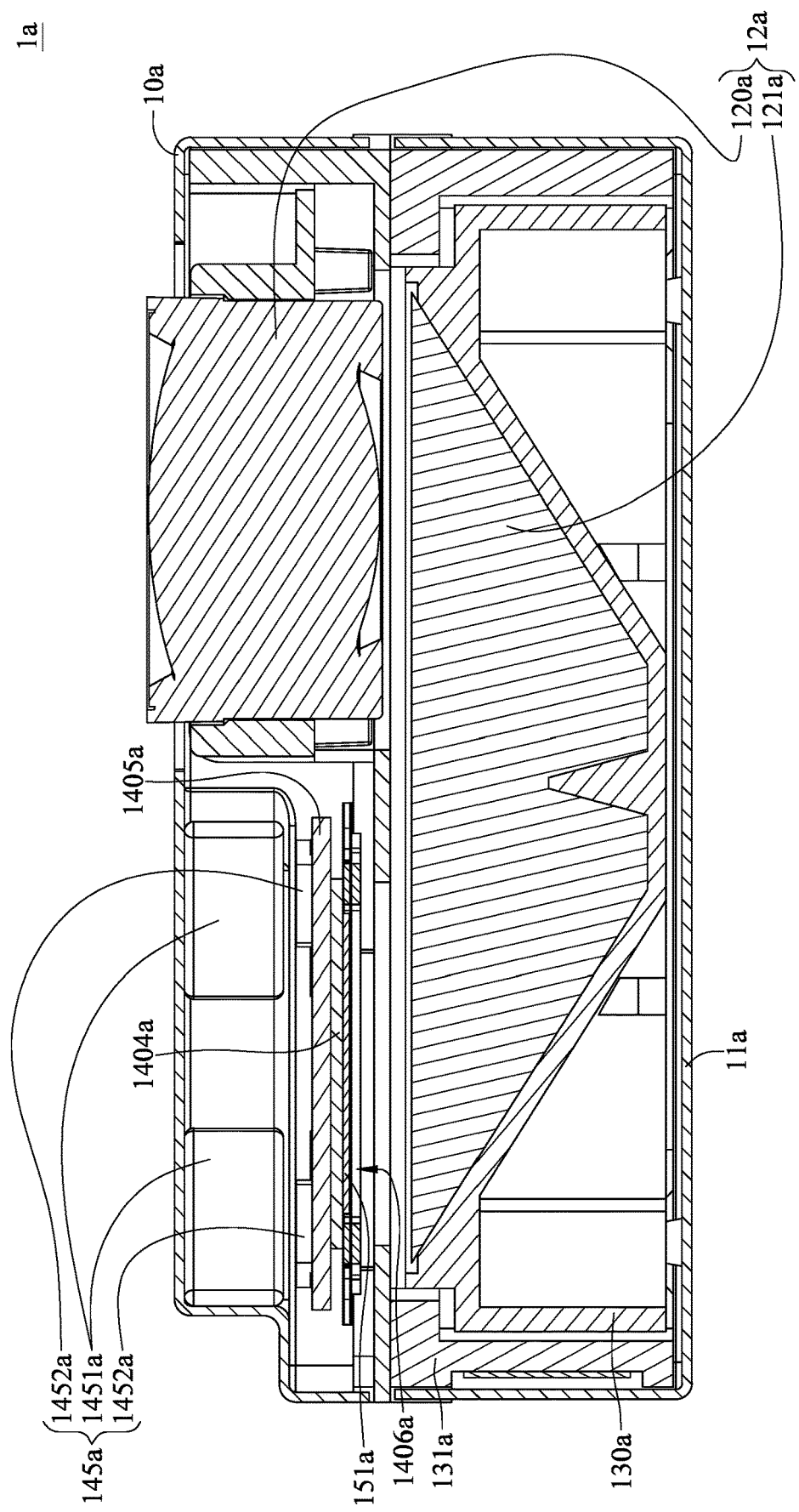
FIG. 27 is a cross-sectional view of the camera module along line 27-27 in FIG. 26.
Figure 28:
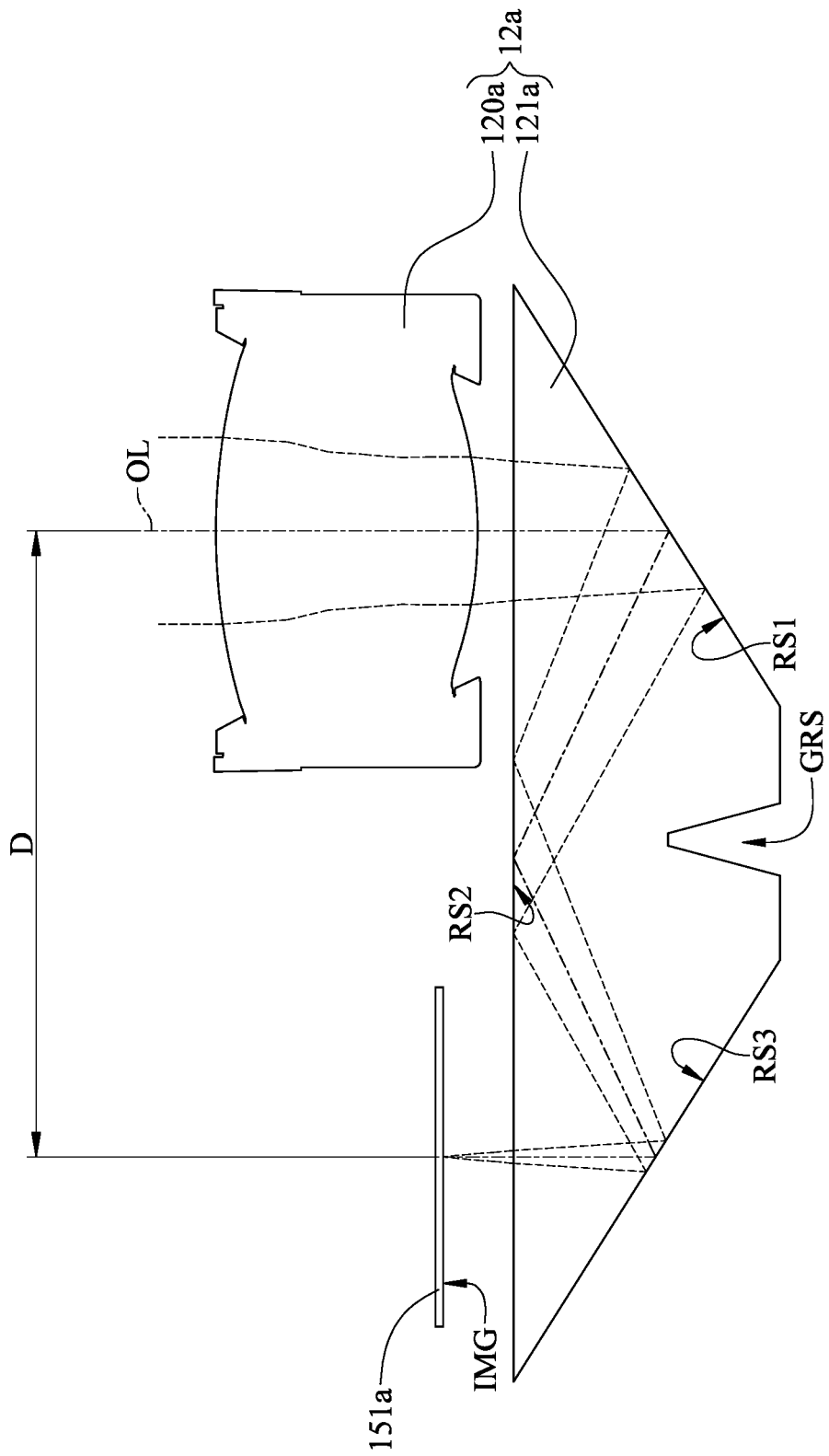
FIG. 28 is a schematic view of an imaging lens, a plastic light-folding element and an image sensor in FIG. 27 and tracks of imaging light rays.
Figure 29:
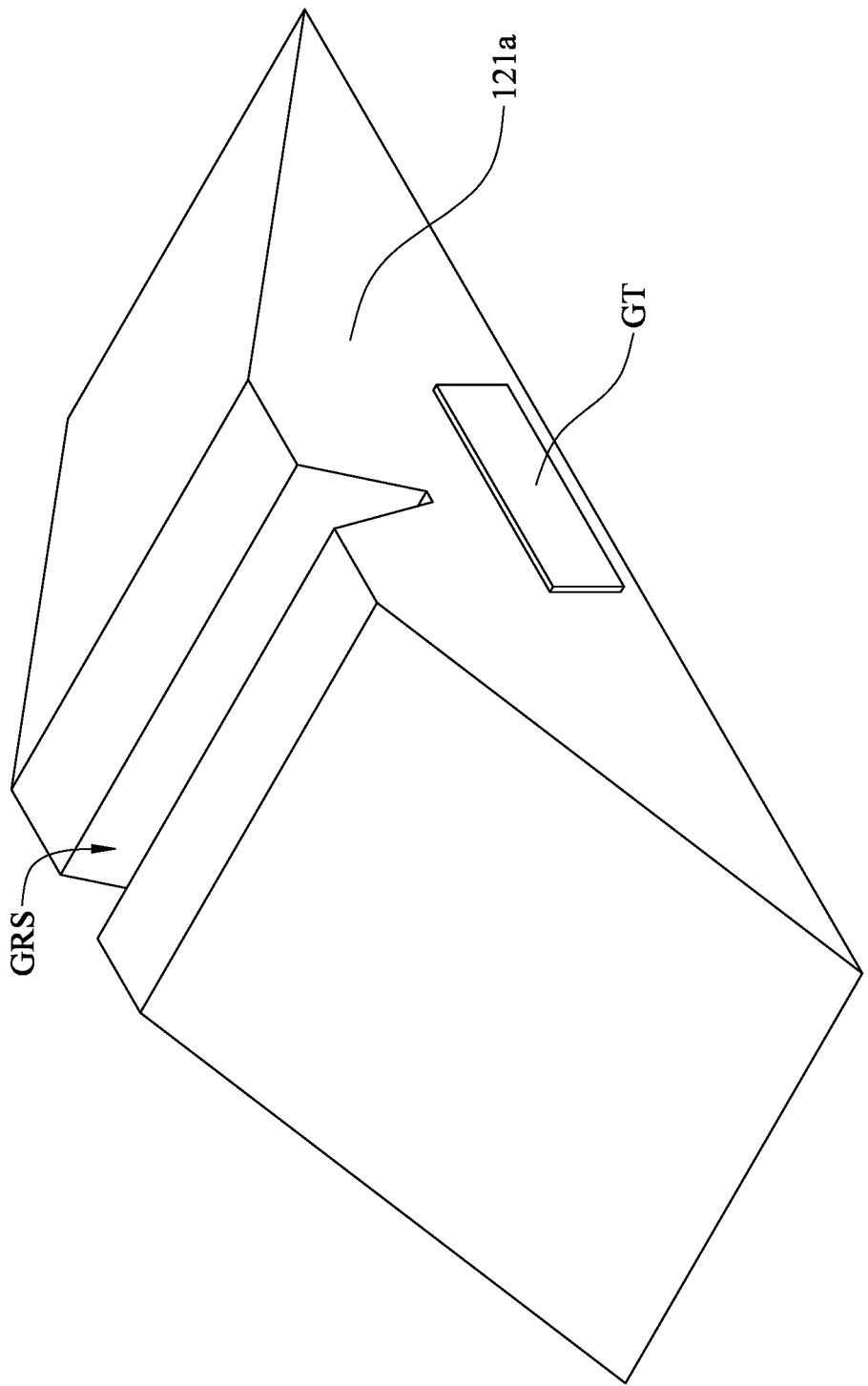
FIG. 29 is a perspective view of the plastic light-folding element in FIG. 28.
Figure 30:
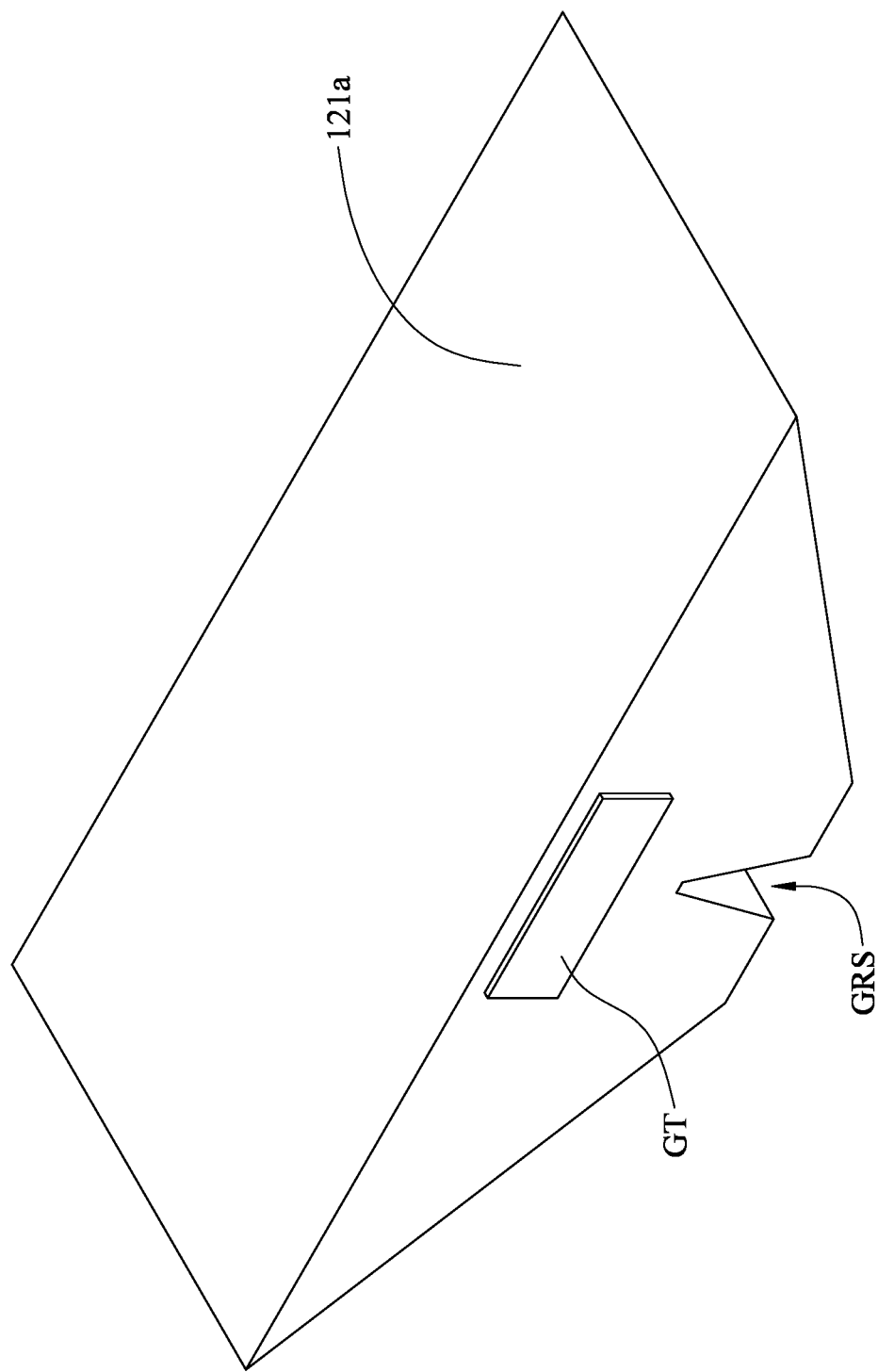
FIG. 30 is another perspective view of the plastic light-folding element in FIG. 28.
Figure 31:
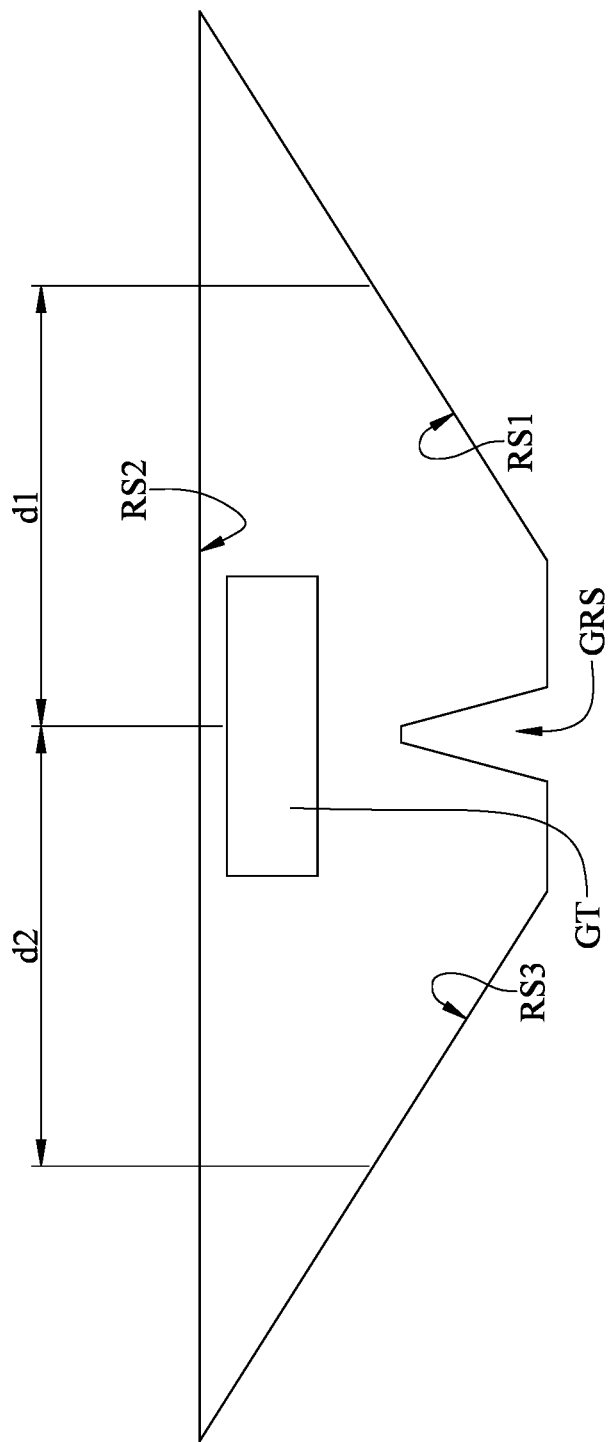
FIG. 31 is a side view of the plastic light-folding element in FIG. 28.
Figure 32:
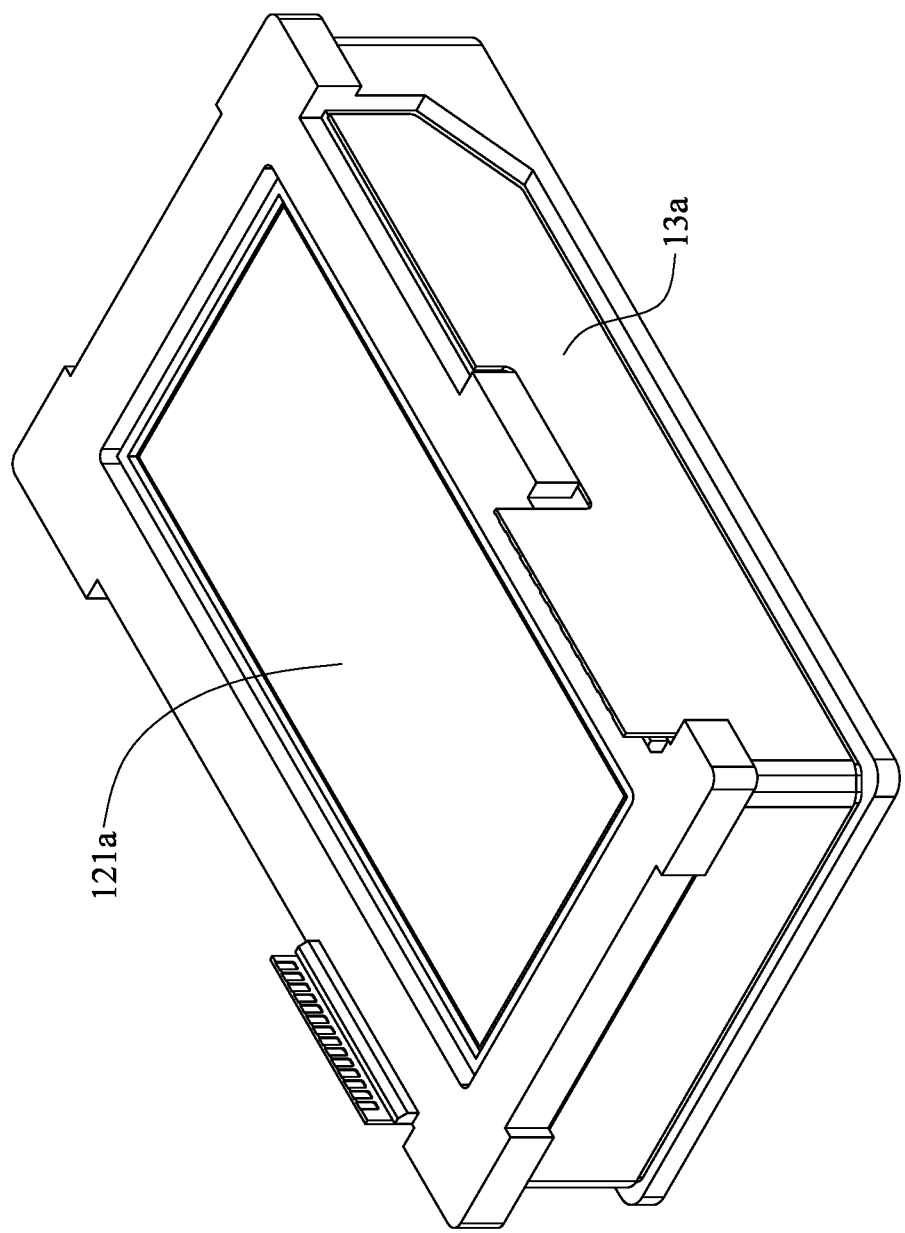
FIG. 32 is a perspective view of the plastic light-folding element and a driving module of the camera module in FIG. 23.
Figure 33:
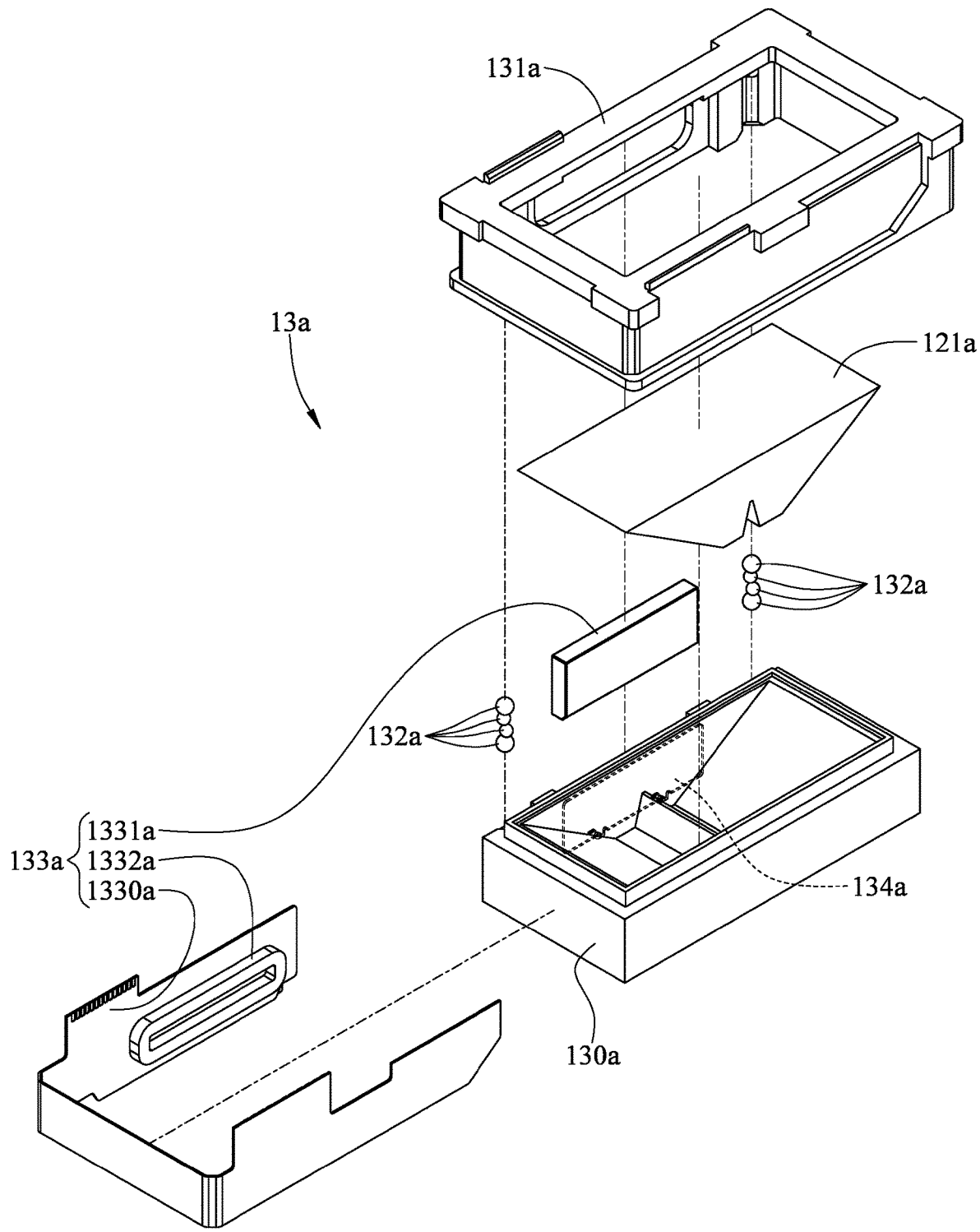
FIG. 33 is an exploded view of the driving module and the plastic light-folding element in FIG. 32.
Figure 34:
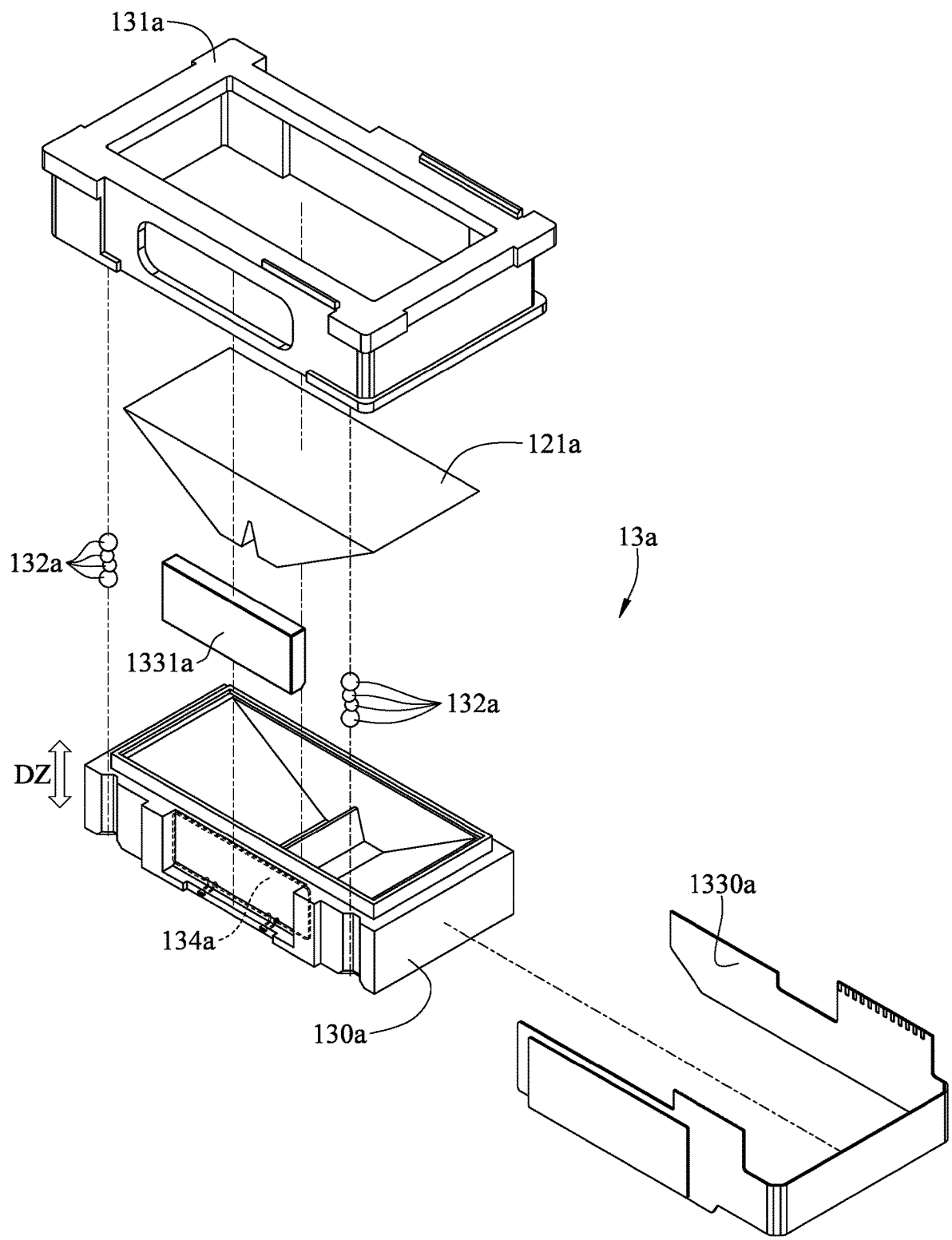
FIG. 34 is another exploded view of the driving module and the plastic light-folding element in FIG. 32.
Figure 35:
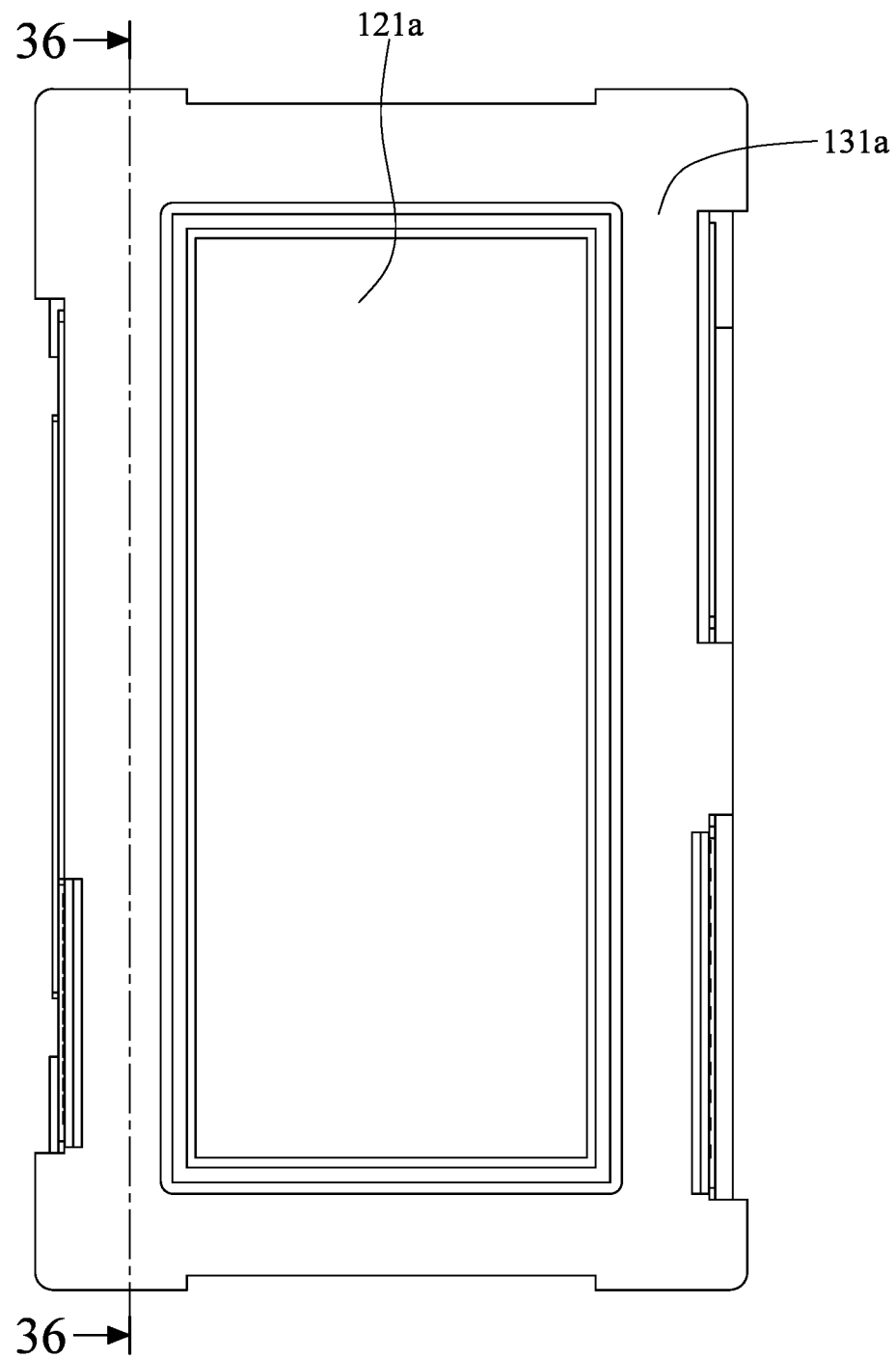
FIG. 35 is a top view of the driving module and the plastic light-folding element in FIG. 32.
Figure 36:
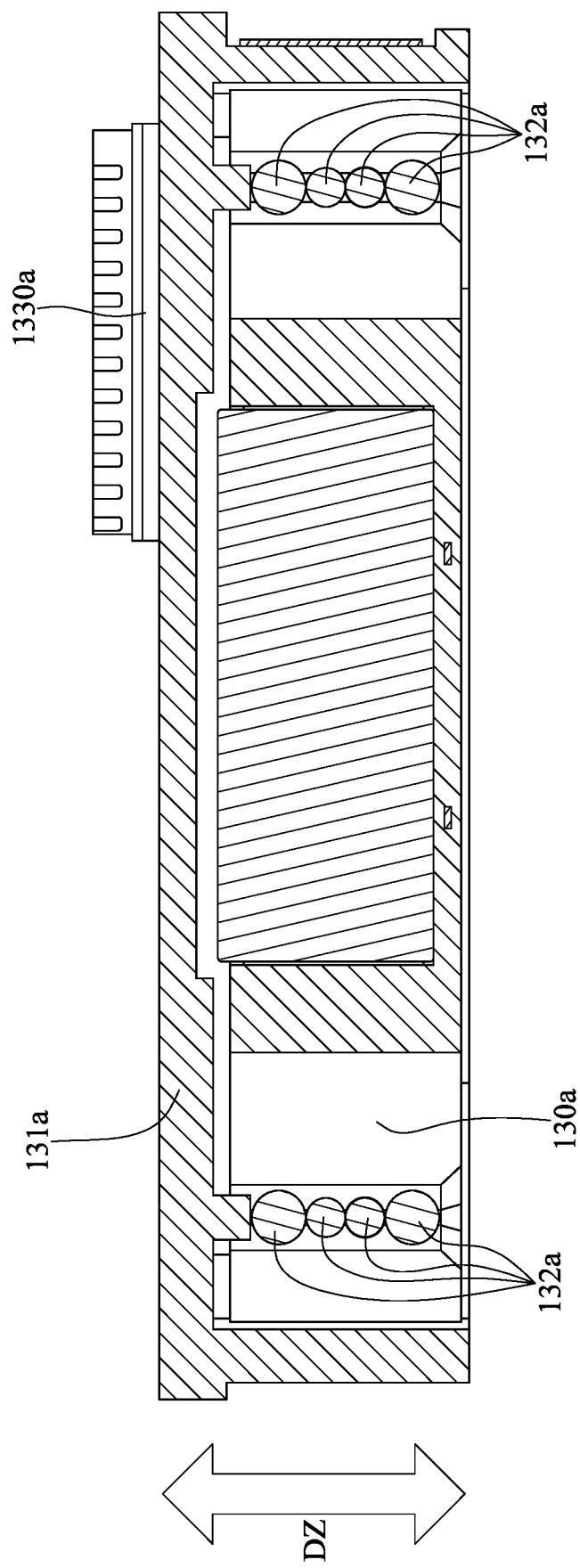
FIG. 36 is a cross-sectional view of the driving module and the plastic light-folding element along line 36-36 in FIG. 35.
Figure 37:
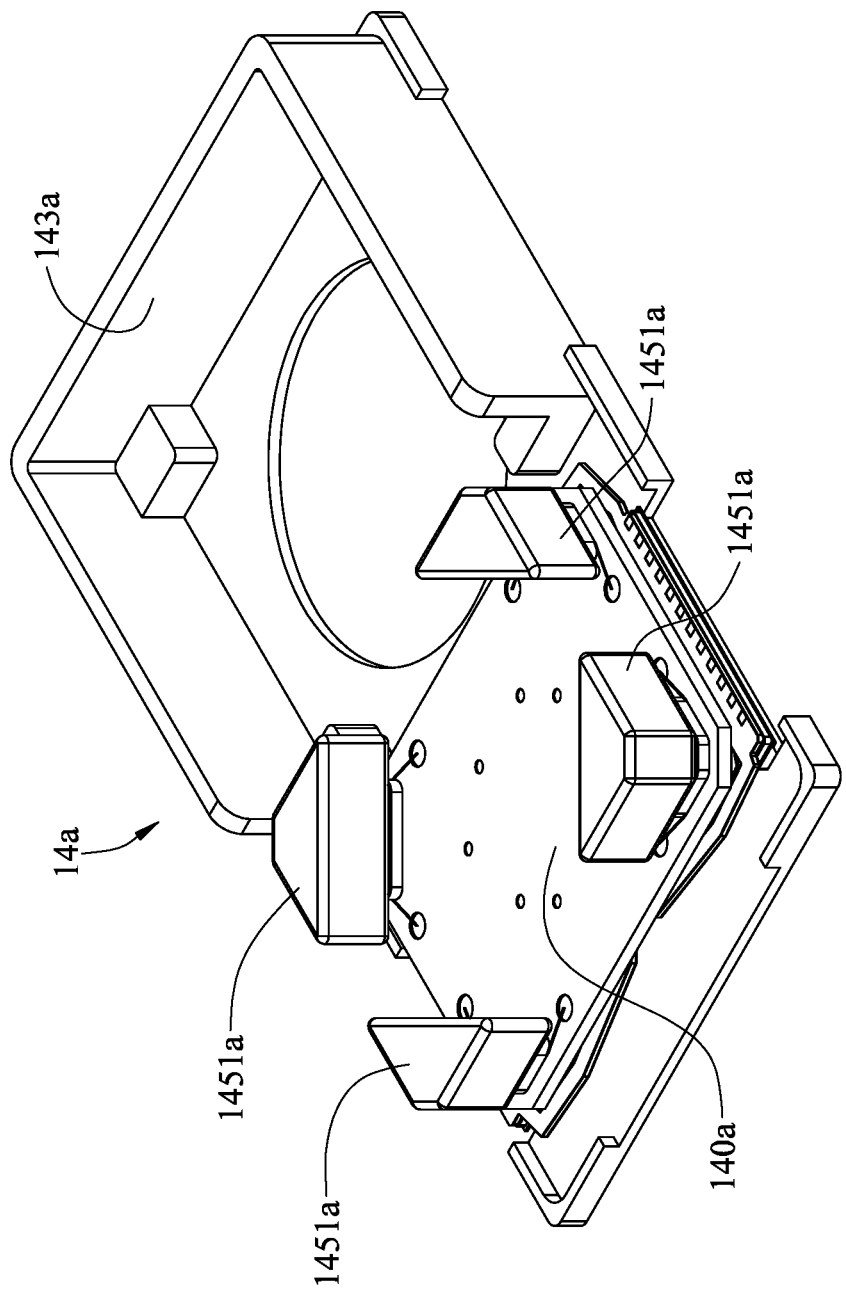
FIG. 37 is a perspective view of the image sensor and an image stabilization module of the camera module in FIG. 23.
Figure 38:
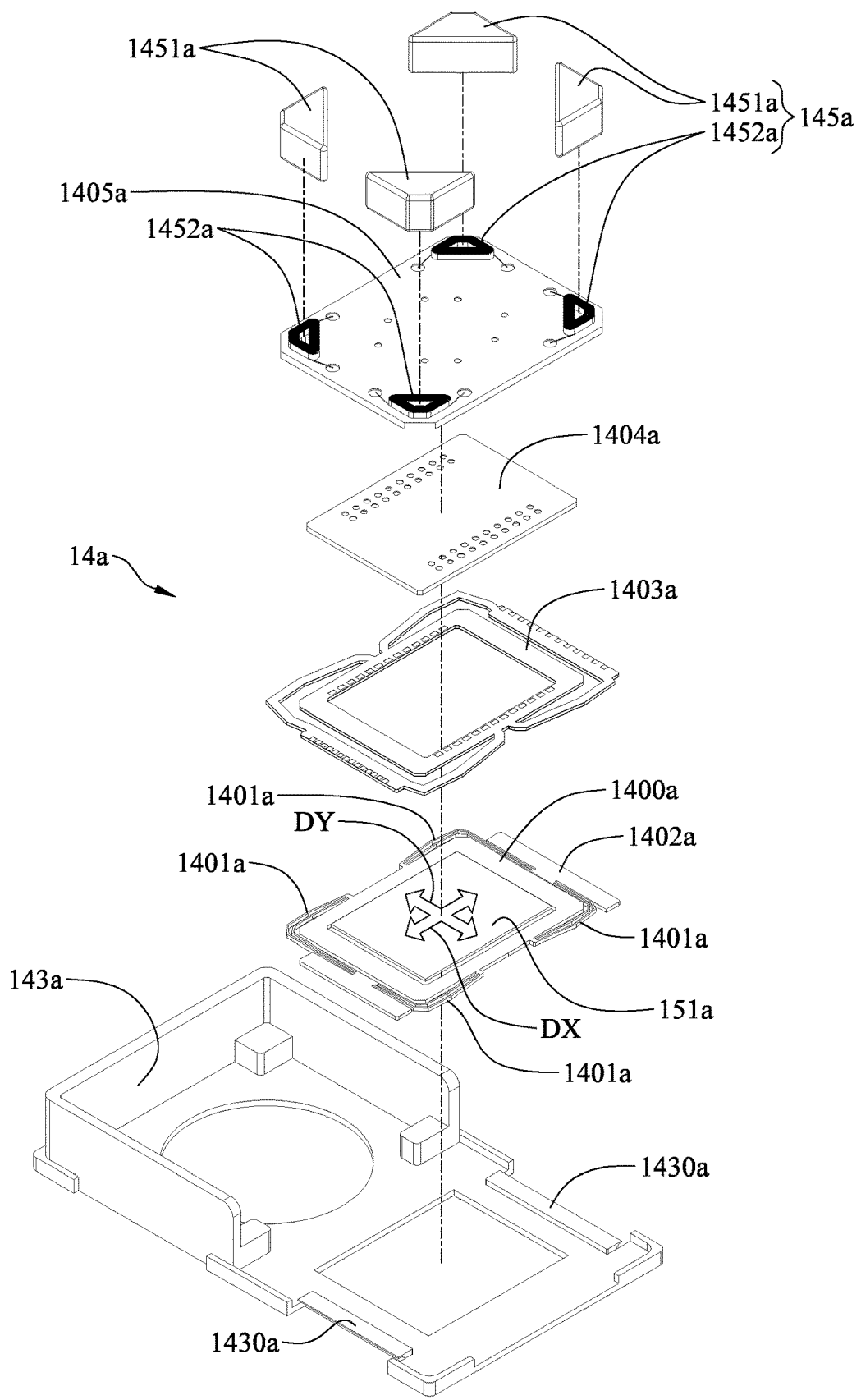
FIG. 38 is an exploded view of the image stabilization module and the image sensor in FIG. 37.
Figure 39:
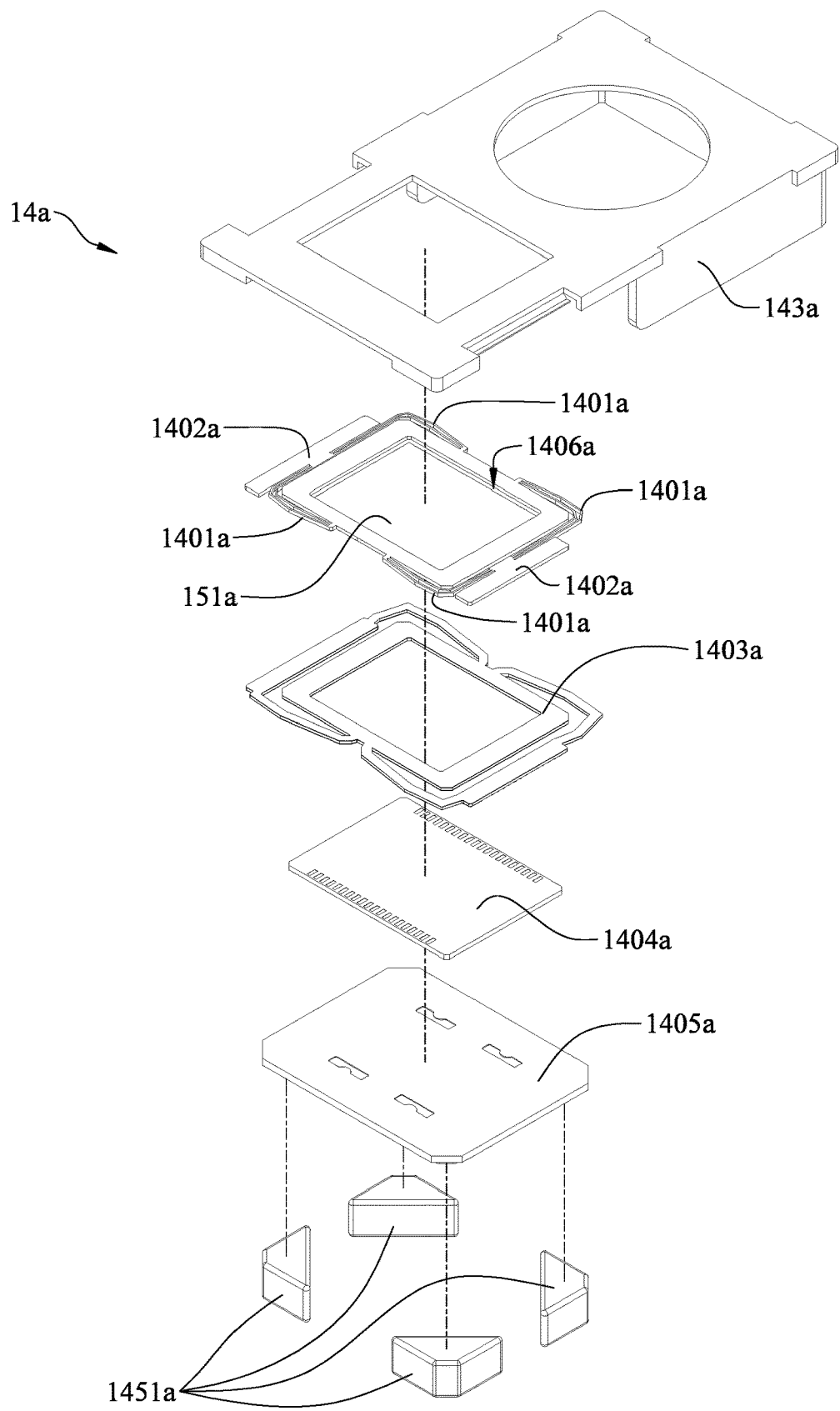
FIG. 39 is another exploded view of the image stabilization module and the image sensor in FIG. 37.
Figure 40:
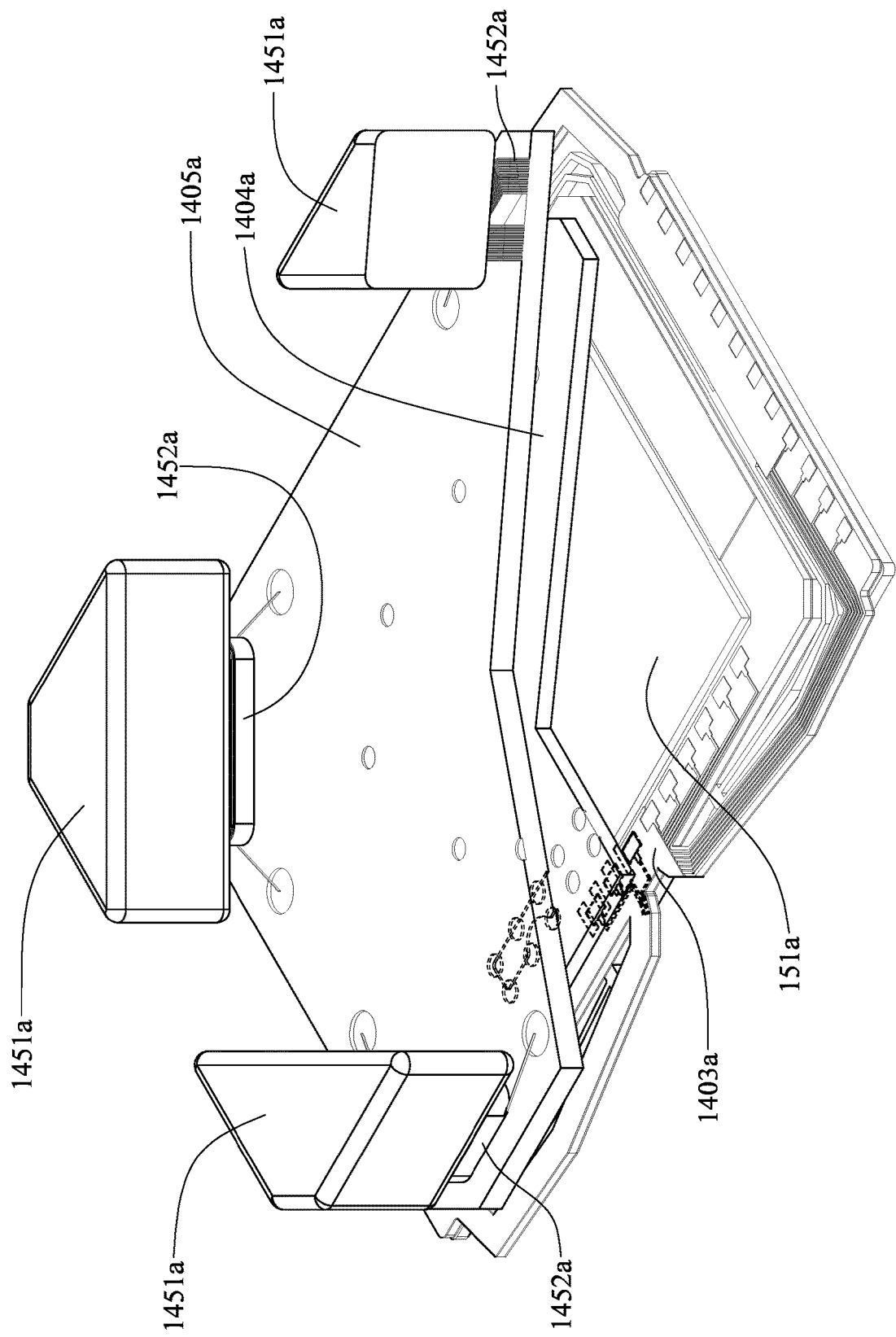
FIG. 40 is a partially sectional view of the image stabilization module and the image sensor in FIG. 37 further showing electrical connections between components of the image stabilization module.

FIG. 23 is a perspective view of a camera module according to the 2nd embodiment of the present disclosure, FIG. 24 is an exploded view of the camera module in FIG. 23, FIG. 25 is another exploded view of the camera module in FIG. 23, FIG. 26 is a top view of the camera module in FIG. 23, FIG. 27 is a cross-sectional view of the camera module along line 27-27 in FIG. 26, FIG. 28 is a schematic view of an imaging lens, a plastic light-folding element and an image sensor in FIG. 27 and tracks of imaging light rays, FIG. 29 is a perspective view of the plastic light-folding element in FIG. 28, FIG. 30 is another perspective view of the plastic light-folding element in FIG. 28, FIG. 31 is a side view of the plastic light-folding element in FIG. 28, FIG. 32 is a perspective view of the plastic light-folding element and a driving module of the camera module in FIG. 23, FIG. 33 is an exploded view of the driving module and the plastic light-folding element in FIG. 32, FIG. 34 is another exploded view of the driving module and the plastic light-folding element in FIG. 32, FIG. 35 is a top view of the driving module and the plastic light-folding element in FIG. 32, FIG. 36 is a cross-sectional view of the driving module and the plastic light-folding element along line 36-36 in FIG. 35, FIG. 37 is a perspective view of the image sensor and an image stabilization module of the camera module in FIG. 23, FIG. 38 is an exploded view of the image stabilization module and the image sensor in FIG. 37, FIG. 39 is another exploded view of the image stabilization module and the image sensor in FIG. 37, and FIG. 40 is a partially sectional view of the image stabilization module and the image sensor in FIG. 37 further showing electrical connections between components of the image stabilization module.

The camera module 1a includes a casing 10a, a base 11a, an imaging lens module 12a, a driving module 13a, an image stabilization module 14a and an image sensor 151a.

The casing 10a has an opening 100a. The base 11a and the casing 10a are coupled with each other and together form an accommodation space S.

The imaging lens module 12a is disposed in the accommodation space S, and the imaging lens module 12a includes an imaging lens 120a and a plastic light-folding element 121a. The imaging lens 120a is disposed corresponding to the opening 100a of the casing 10a, and an optical axis OL of the imaging lens 120a passes through the opening 100a of the casing 10a. More specifically, the imaging lens 120a is exposed to the outside by the opening 100a of the casing 10a so as to be visible to users. The plastic light-folding element 121a is located on the optical axis OL, and the plastic light-folding element 121a is located on an image side of the imaging lens 120a.

The plastic light-folding element 121a is a prism made by an injection molding process, and an Abbe number of the plastic light-folding element 121a is larger than or equal to 35 and smaller than or equal to 65. In addition, the plastic light-folding element 121a has three reflection surfaces RS1, RS2 and RS3, a gate trace GT and a recessed structure GRS. The recessed structure GRS of the plastic light-folding element 121a extends and tapers off from the outer surface of the plastic light-folding element 121a toward the gate trace GT.

The plastic light-folding element 121a is configured to fold the optical axis OL three times. In specific, as shown in FIG. 27 and FIG. 28, the three reflection surfaces RS1, RS2 and RS3 of the plastic light-folding element 121a are configured to fold the optical axis OL, and an imaging light travelling along the optical axis OL in the plastic light-folding element 121a can be totally reflected at the reflection surfaces RS1, RS2 and RS3, respectively, thus undergoing internal reflection three times.

As shown in FIG. 34 and FIG. 36, the driving module 13a is configured to drive the plastic light-folding element 121a to move in a direction DZ parallel to the optical axis OL. In specific, the driving module 13a includes a first holder 130a, a fixed frame 131a, a plurality of rollable supports 132a, a first driving mechanism 133a and a ferromagnetic element 134a. The first holder 130a holds the plastic light-folding element 121a, and the fixed frame 131a is disposed corresponding to the first holder 130a.

The rollable supports 132a are spherical and disposed between the first holder 130a and the fixed frame 131a, and the rollable supports 132a provide the first holder 130a with a degree of freedom associated with translational motion in a direction parallel to the optical axis OL relative to the fixed frame 131a.

The first driving mechanism 133a is configured to drive the first holder 130a to move relative to the fixed frame 131a. In specific, the first driving mechanism 133a includes a flexible printed circuit board 1330a, a magnet 1331a and a coil 1332a. The flexible printed circuit board 1330a is attached to the fixed frame 131a, the magnet 1331a is fixed to the first holder 130a, and the coil 1332a is disposed on the flexible printed circuit board 1330a and corresponds to the magnet 1331a so as to provide a driving force for driving the first holder 130a to move relative to the fixed frame 131a.

The ferromagnetic element 134a and the first holder 130a are integrally formed by an insert molding process, and the ferromagnetic element 134a is disposed corresponding to the magnet 1331a of the first driving mechanism 133a.

In this embodiment, as shown in FIG. 38, the image stabilization module 14a is an OIS module configured to drive the image sensor 151a to move in directions DX and DY perpendicular to the optical axis OL. Furthermore, the image stabilization module 14a includes a second holder 140a, a fixed base 143a and a second driving mechanism 145a. The second holder 140a includes a carrier plate 1400a, a plurality of elastic connection components 1401a, two contact components 1402a, a flexible printed circuit board 1403a, a substrate 1404a and a printed circuit board 1405a.

One end of each of the elastic connection components 1401a is connected to the carrier plate 1400a, and another end of each of the elastic connection components 1401a is connected to the contact components 1402a. The fixed base 143a has two corresponding portions 1430a respectively in physical contact with the contact components 1402a, such that the elastic connection components 1401a can provide the second holder 140a with a degree of freedom associated with translational motion relative to the fixed base 143a.

The flexible printed circuit board 1403a is provided on the carrier plate 1400a. The substrate 1404a is provided on and electrically connected to the flexible printed circuit board 1403a. The printed circuit board 1405a is provided on and electrically connected to the substrate 1404a. The image sensor 151a is disposed on and electrically connected to the substrate 1404a. Therefore, the image sensor 151a is indirectly disposed on the carrier plate 1400a via the substrate 1404a and the flexible printed circuit board 1403a so as to be movable along with the second holder 140a relative to the fixed base 143a.

The second driving mechanism 145a is configured to drive the second holder 140a to move relative to the fixed base 143a. Specifically, the second driving mechanism 145a includes four second magnets 1451a and four second coils 1452a. The second coils 1452a are disposed on the printed circuit board 1405a, and the second magnets 1451a are respectively disposed corresponding to the second coils 1452a so as to provide a driving force for driving the printed circuit board 1405a to move, and thus, driving the second holder 140a to move relative to the fixed base 143a.

In this embodiment, the imaging lens 120a is disposed on the fixed base 143a of the image stabilization module 14a. Moreover, the carrier plate 1400a of the second holder 140a has an opening 1406a corresponding to the image sensor 151a, and thus, imaging light from the plastic light-folding element 121a can pass through the opening 1406a of the carrier plate 1400a and reach the image sensor 151a. Furthermore, the image sensor 151a is located on an image surface IMG of the imaging lens 120a, and the image sensor 151a is configured to convert the imaging light passing through the imaging lens module 12a into image signal(s). Moreover, the imaging lens 120a and the image sensor 151a are located on the same side of the plastic light-folding element 121a.

In this embodiment, the imaging lens module 12a, the driving module 13a, the image stabilization module 14a and the image sensor 151a are disposed in the accommodation space S.

As shown in FIG. 28, when a deviated distance between a center of the imaging lens 120a and a center of the image sensor 151a in a direction perpendicular to the optical axis OL is D, the following condition is satisfied: D=9 mm.

As shown in FIG. 31, the two reflection surfaces RS1 and RS3 of the plastic light-folding element 121a are symmetrically arranged with respect to the gate trace GT as a center. Moreover, when a deviated distance between a center of the gate trace GT and a center of the reflection surface RS1 in a direction perpendicular to the optical axis OL is d1, and a deviated distance between the center of the gate trace GT and a center of the reflection surface RS3 in a direction perpendicular to the optical axis OL is d2, the following condition is satisfied: |d1−d2|<0.085 mm.

3rd Embodiment

Figure 41:
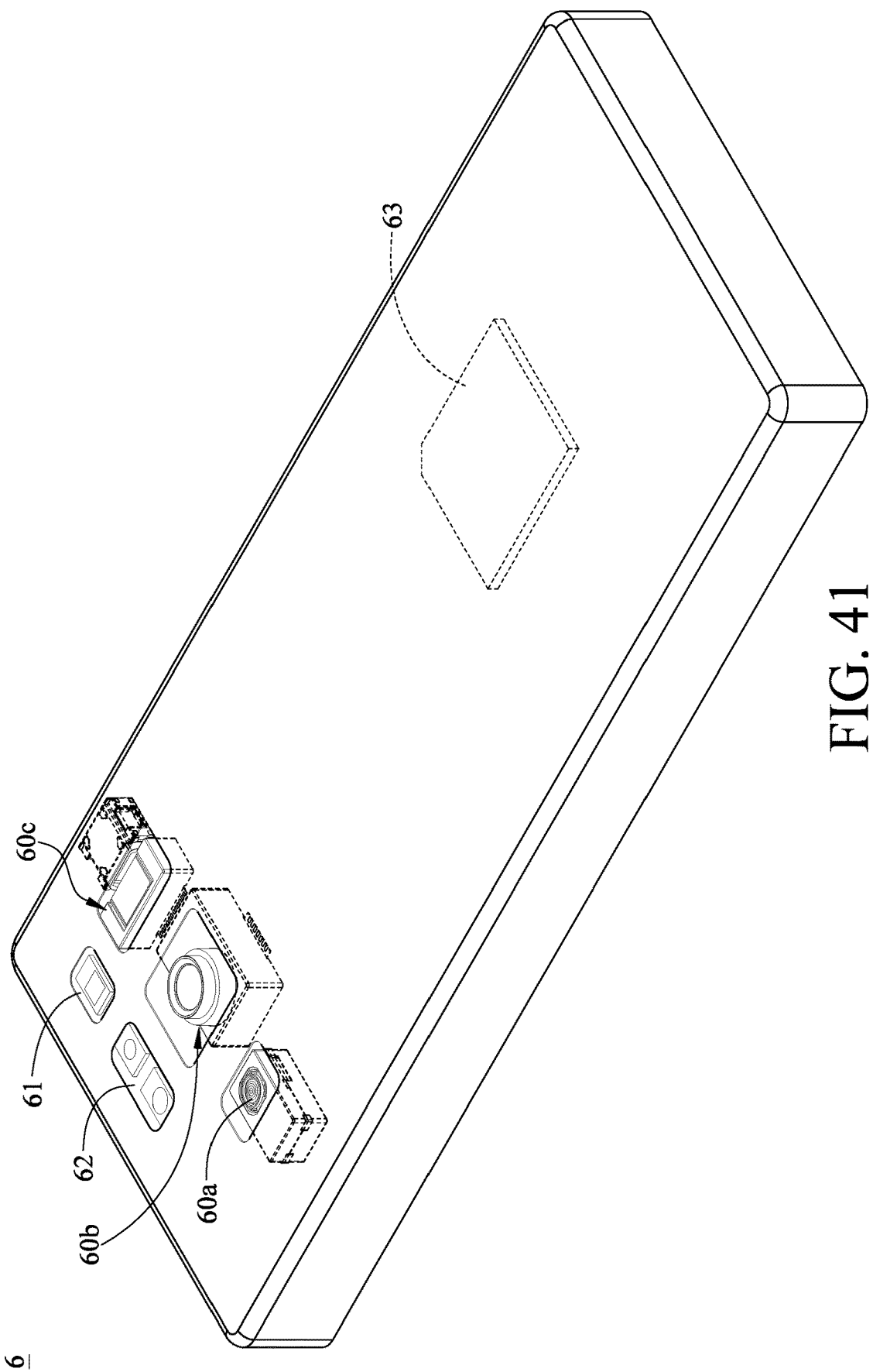
FIG. 41 is one perspective view of an electronic device according to the 3rd embodiment of the present disclosure.
Figure 42:
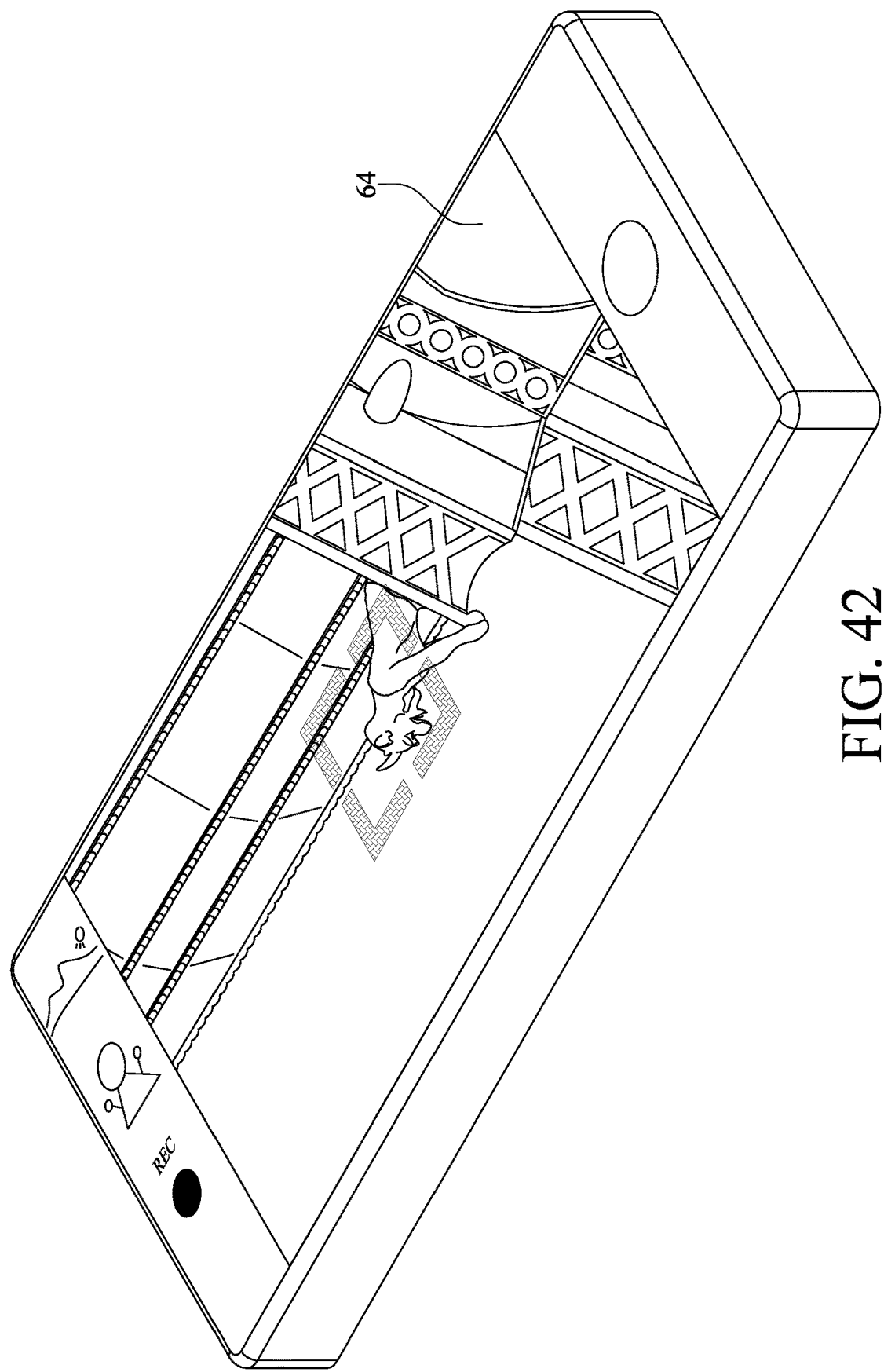
FIG. 42 is another perspective view of the electronic device in FIG. 41.

FIG. 41 is one perspective view of an electronic device according to the 3rd embodiment of the present disclosure, and FIG. 42 is another perspective view of the electronic device in FIG. 41.

In this embodiment, the electronic device 6 is a smartphone including a plurality of camera modules, a flash module 61, a focus assist module 62, an image signal processor 63, a display module (user interface) 64 and an image software processor (not shown).

The camera modules include an ultra-wide-angle camera module 60a, a high pixel camera module 60b and a telephoto camera module 60c. Moreover, the ultra-wide-angle camera module 60a includes the camera module 1 as disclosed in the 1st embodiment of the present disclosure, but the present disclosure is not limited thereto. In other embodiments, the ultra-wide-angle camera module 60a can include a camera module of another embodiment of the present disclosure.

Figure 43:
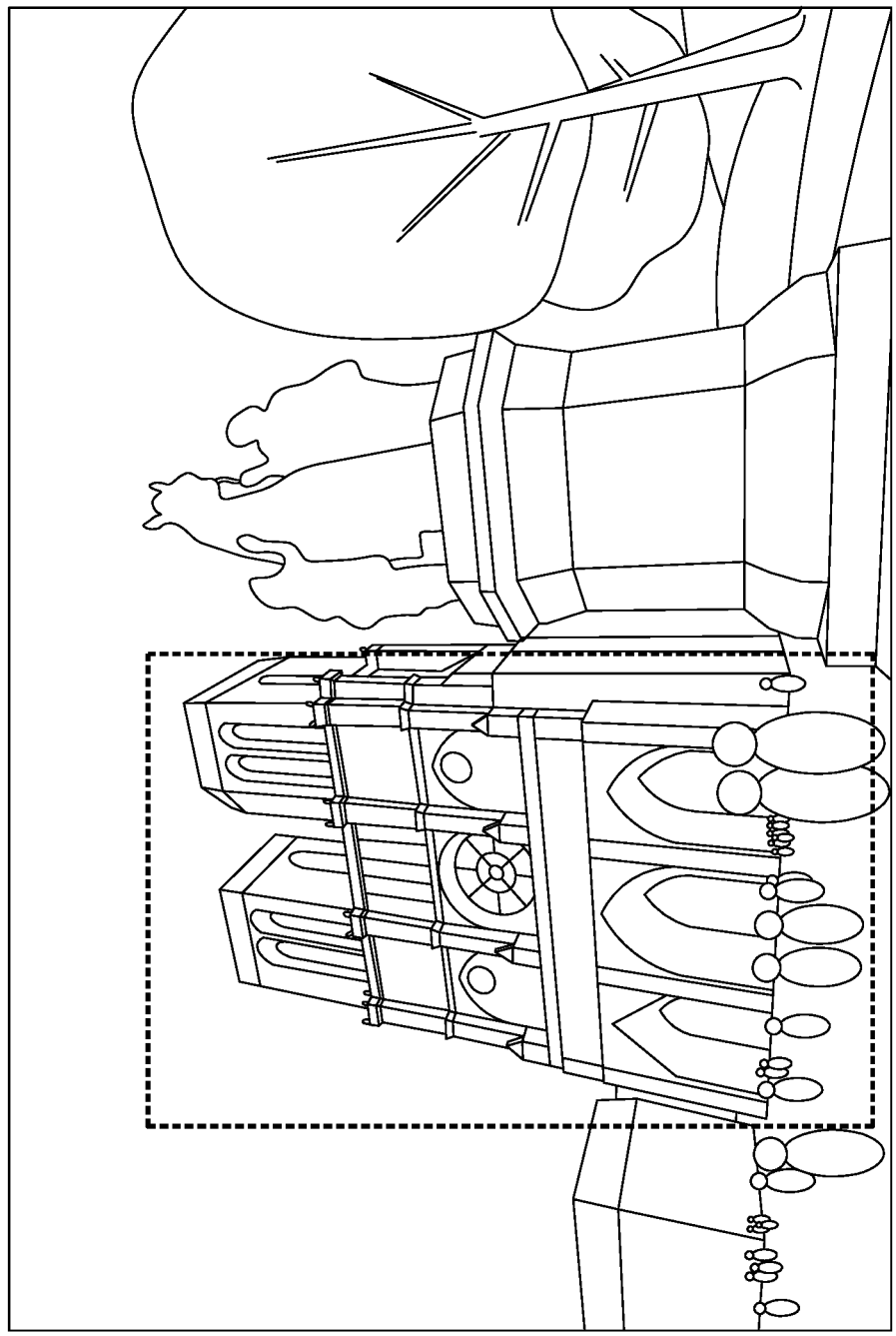
FIG. 43 is an image captured by an ultra-wide-angle camera module.

The image captured by the ultra-wide-angle camera module 60a enjoys a feature of multiple imaged objects. FIG. 43 is an image captured by the ultra-wide-angle camera module 60a.

Figure 44:
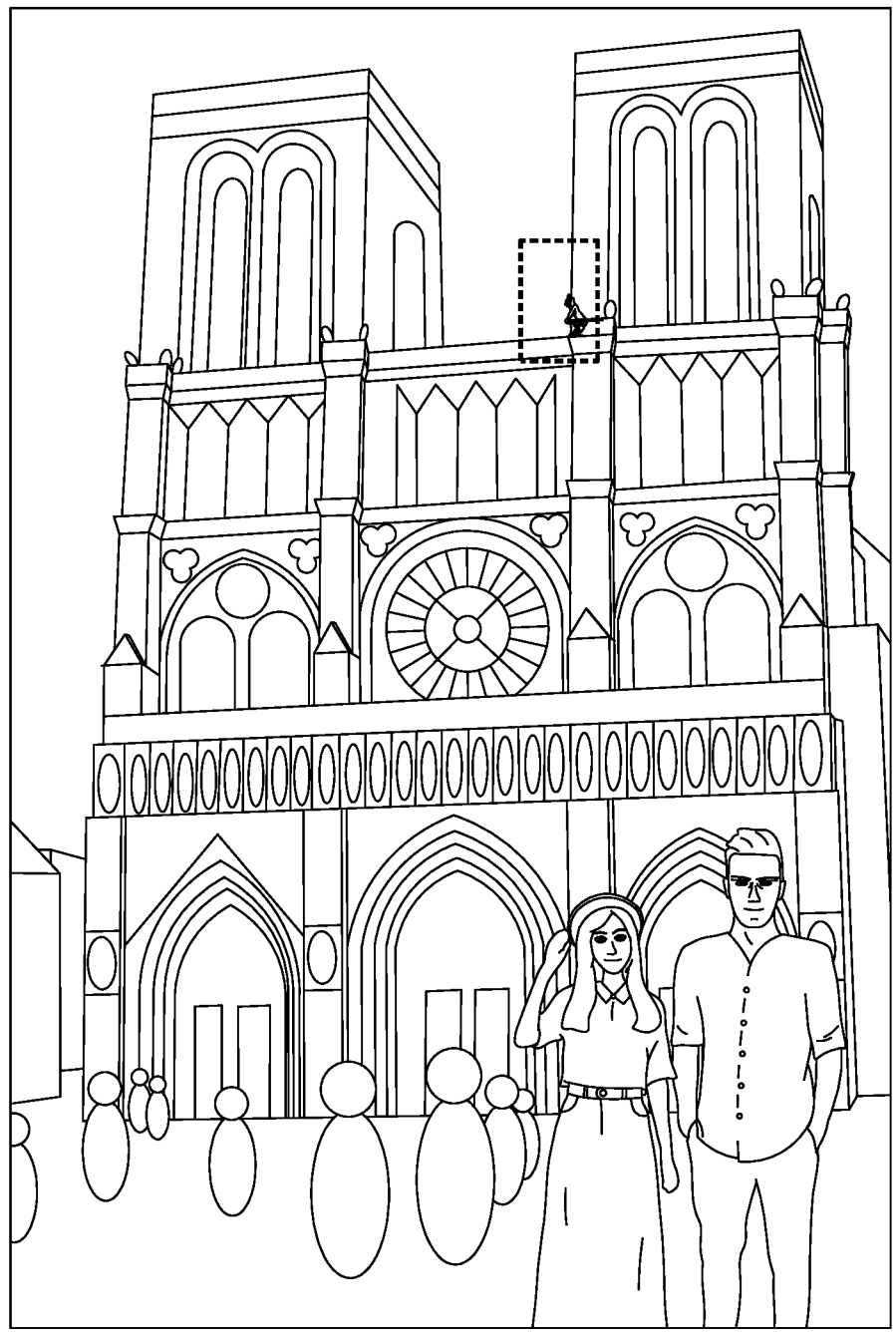
FIG. 44 is an image captured by a high pixel camera module.

The image captured by the high pixel camera module 60b enjoys a feature of high resolution and less distortion, and the high pixel camera module 60b can capture part of the image in FIG. 43. FIG. 44 is an image captured by the high pixel camera module 60b.

Figure 45:
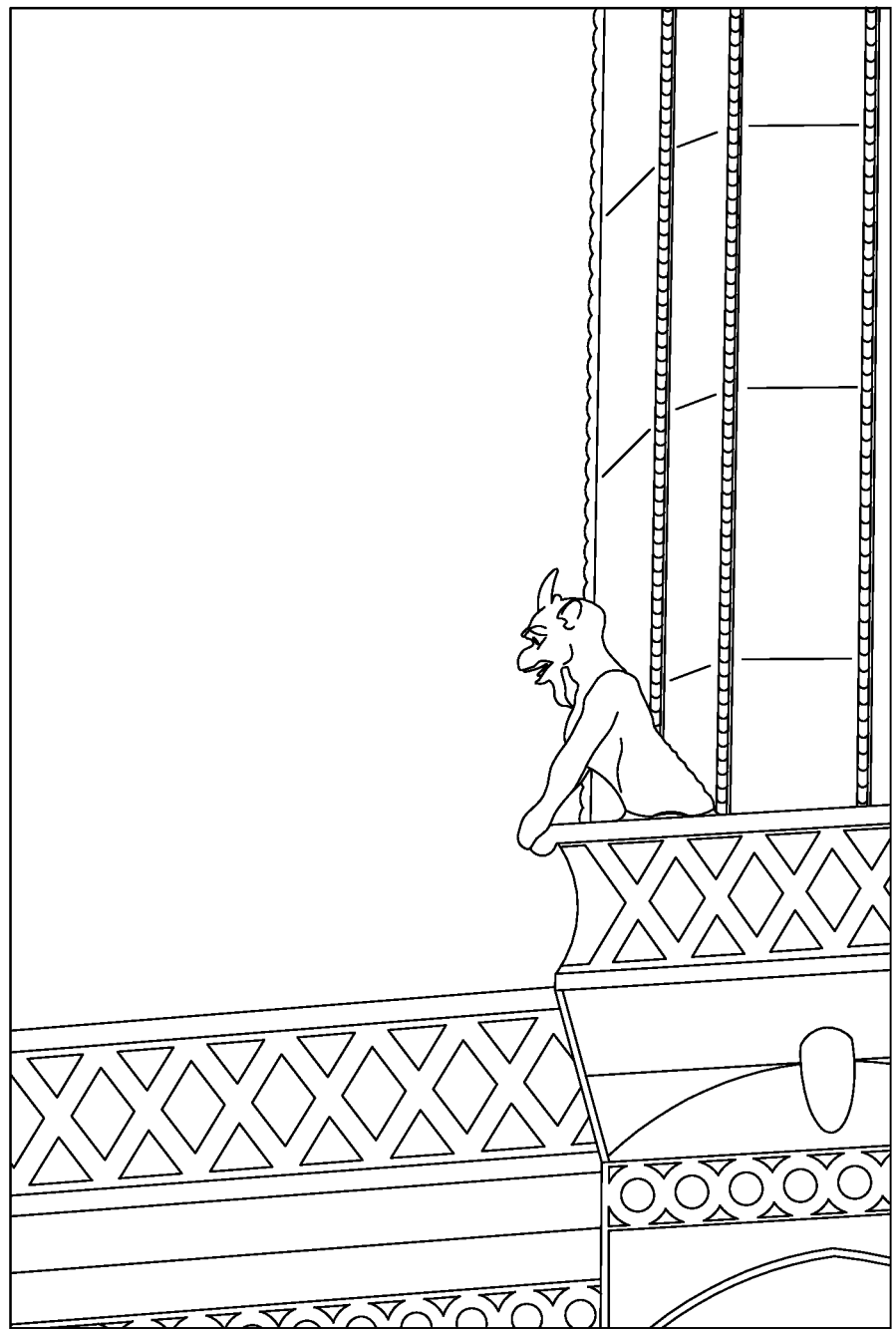
FIG. 45 is an image captured by a telephoto camera module.

The image captured by the telephoto camera module 60c enjoys a feature of high optical magnification, and the telephoto camera module 60c can capture part of the image in FIG. 44. FIG. 45 is an image captured by the telephoto camera module 60c. The maximum field of view of the camera module corresponds to the field of view in FIG. 45.

When a user captures images of an object, the light rays converge in the ultra-wide-angle camera module 60a, the high pixel camera module 60b or the telephoto camera module 60c to generate images, and the flash module 61 is activated for light supplement. The focus assist module 62 detects the object distance of the imaged object to achieve fast auto focusing. The image signal processor 63 is configured to optimize the captured image to improve image quality and provided zooming function. The light beam emitted from the focus assist module 62 can be either conventional infrared or laser. The display module 64 can include a touch screen, and the user is able to interact with the display module 64 to adjust the angle of view and switch between different camera modules, and the image software processor having multiple functions to capture images and complete image processing. Alternatively, the user may capture images via a physical button. The image processed by the image software processor can be displayed on the display module 64.

4th Embodiment

Figure 46:
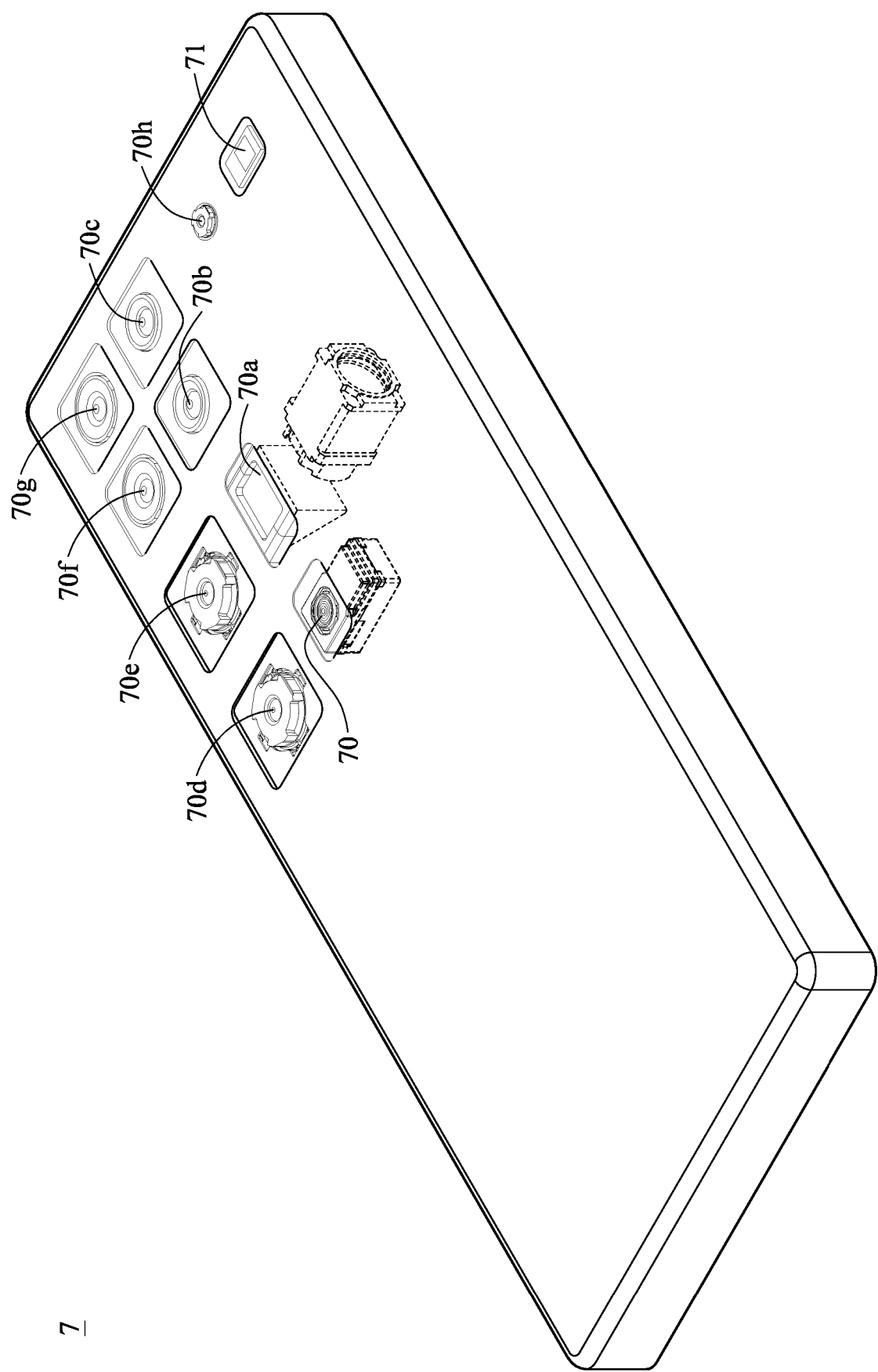
FIG. 46 is a perspective view of an electronic device according to the 4th embodiment of the present disclosure.

FIG. 46 is a perspective view of an electronic device according to the 4th embodiment of the present disclosure.

In this embodiment, the electronic device 7 is a smartphone including a camera module 70, a camera module 70a, a camera module 70b, a camera module 70c, a camera module 70d, a camera module 70e, a camera module 70f, a camera module 70g, a camera module 70h, a flash module 71, an image signal processor, a display module and an image software processor (not shown). The camera module 70 includes the camera module 1a as disclosed in the 2nd embodiment of the present disclosure, but the present disclosure is not limited thereto. In other embodiments, the camera module 70 can include, for example, a camera module of another embodiment of the present disclosure. The camera module 70, the camera module 70a, the camera module 70b, the camera module 70c, the camera module 70d, the camera module 70e, the camera module 70f, the camera module 70g and the camera module 70h are disposed on the same side of the electronic device 7, while the display module is disposed on the opposite side of the electronic device 7.

The camera module 70 is a telephoto camera module, the camera module 70a is a telephoto camera module, the camera module 70b is a telephoto camera module, the camera module 70c is a telephoto camera module, the camera module 70d is a wide-angle camera module, the camera module 70e is a wide-angle camera module, the camera module 70f is an ultra-wide-angle camera module, the camera module 70g is an ultra-wide-angle camera module, and the camera module 70h is a ToF (time of flight) camera module. In this embodiment, the camera module 70, the camera module 70a, the camera module 70b, the camera module 70c, the camera module 70d, the camera module 70e, the camera module 70f and the camera module 70g have different fields of view, such that the electronic device 7 can have various magnification ratios so as to meet the requirement of optical zoom functionality. In addition, the camera module 70 and the camera module 70a are telephoto camera modules having a light-folding element configuration. In addition, the camera module 70h can determine depth information of the imaged object. In this embodiment, the electronic device 7 includes multiple camera modules 70, 70a, 70b, 70c, 70d, 70e, 70f, 70g, and 70h, but the present disclosure is not limited to the number and arrangement of camera module. When a user captures images of an object, the light rays converge in the camera module 70, 70a, 70b, 70c, 70d, 70e, 70f, 70g or 70h to generate an image(s), and the flash module 71 is activated for light supplement. Further, the subsequent processes are performed in a manner similar to the abovementioned embodiments, so the details in this regard will not be provided again.

The smartphones in the embodiments are only exemplary for showing the camera module of the present disclosure installed in an electronic device, and the present disclosure is not limited thereto. The camera module can be optionally applied to optical systems with a movable focus. Furthermore, the camera module features good capability in aberration corrections and high image quality, and can be applied to 3D (three-dimensional) image capturing applications, in products such as digital cameras, mobile devices, digital tablets, smart televisions, network surveillance devices, multi-camera devices, image recognition systems, panoramic view car cameras, dashboard cameras, vehicle backup cameras, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module comprising:
a casing having an opening;
a base coupled to the casing, and the base and the casing together forming an accommodation space;
an imaging lens module disposed in the accommodation space, and the imaging lens module comprising:
an imaging lens disposed corresponding to the opening of the casing, and an optical axis of the imaging lens passing through the opening; and
a plastic light-folding element located on the optical axis and configured to fold the optical axis at least one time;
a driving module configured to drive the plastic light-folding element to move in a direction parallel to the optical axis, and the driving module comprising:
a first holder holding the plastic light-folding element;
a fixed frame disposed corresponding to the first holder;
a first rollable support disposed between the first holder and the fixed frame;
a first driving mechanism configured to drive the first holder to move relative to the fixed frame; and
a first ferromagnetic element disposed corresponding to a first magnet of the first driving mechanism, wherein the first ferromagnetic element and the first holder are integrally formed by an insert molding process;
an image stabilization module configured to drive the imaging lens to move in a direction perpendicular to the optical axis; and
an image sensor disposed on an image surface of the imaging lens and configured to convert an imaging light passing through the imaging lens module into an image signal;
wherein the plastic light-folding element is located on an image side of the imaging lens;
wherein a deviated distance between a center of the imaging lens and a center of the image sensor in a direction perpendicular to the optical axis is D, and the following condition is satisfied:

$$2 \text{ mm} < D < 22 \text{ mm}.$$

2. The camera module of claim 1, wherein the imaging lens and the image sensor are located on a same side of the plastic light-folding element.

3. The camera module of claim 1, wherein the deviated distance between the center of the imaging lens and the center of the image sensor in the direction perpendicular to the optical axis is D, and the following condition is satisfied:

$$4 \text{ mm} < D < 17 \text{ mm}.$$

4. The camera module of claim 1, wherein the image stabilization module comprises:
a second holder holding the imaging lens;
a movable plate disposed corresponding to the second holder;
a second rollable support disposed between the second holder and the movable plate;
a fixed base disposed corresponding to the movable plate;
a third rollable support disposed between the movable plate and the fixed base;
a second driving mechanism configured to drive the second holder to move relative to the fixed base; and
a second ferromagnetic element disposed corresponding to a second magnet of the second driving mechanism.

5. The camera module of claim 4, wherein the second ferromagnetic element and the second holder are integrally formed by an insert molding process.

6. The camera module of claim 1, wherein an imaging light travelling along the optical axis in the plastic light-folding element undergoes total internal reflection.

7. The camera module of claim 1, wherein the plastic light-folding element has:

at least one gate trace; and
at least one reflection surface configured to fold the optical axis.

8. The camera module of claim 7, wherein a number of the at least one gate trace is one, and a number of the at least one reflection surface is three.

9. The camera module of claim 8, wherein two of the three reflection surfaces are symmetrically arranged with respect to the one gate trace as a center.

10. The camera module of claim 9, wherein a deviated distance between a center of the one gate trace and a center of one of the two reflection surfaces symmetrically arranged in a direction perpendicular to the optical axis is d1, a deviated distance between the center of the one gate trace and a center of other of the two reflection surfaces in a direction perpendicular to the optical axis is d2, and the following condition is satisfied:

$$|d1-d2| < 0.085 \text{ mm}.$$

11. The camera module of claim 7, wherein the plastic light-folding element further has at least one recessed structure extending and tapering off from an outer surface of the plastic light-folding element toward the at least one gate trace.

12. The camera module of claim 1, wherein an Abbe number of the plastic light-folding element is larger than or equal to 35 and smaller than or equal to 65.

13. An electronic device comprising:
the camera module of claim 1.

14. A camera module comprising:
a casing having an opening;
a base coupled to the casing, and the base and the casing together forming an accommodation space;
an imaging lens module disposed in the accommodation space, and the imaging lens module comprising:
an imaging lens disposed corresponding to the opening of the casing, and an optical axis of the imaging lens passing through the opening; and
a plastic light-folding element located on the optical axis and configured to fold the optical axis at least one time;
a driving module configured to drive the plastic light-folding element to move in a direction parallel to the optical axis, and the driving module comprising:
a first holder holding the plastic light-folding element;
a fixed frame disposed corresponding to the first holder;
a rollable support disposed between the first holder and the fixed frame;
a first driving mechanism configured to drive the first holder to move relative to the fixed frame; and
a ferromagnetic element disposed corresponding to a magnet of the first driving mechanism, wherein the ferromagnetic element and the first holder are integrally formed by an insert molding process;
an image sensor disposed on an image surface of the imaging lens and configured to convert an imaging light passing through the imaging lens module into an image signal; and
an image stabilization module configured to drive the image sensor to move in a direction perpendicular to the optical axis;
wherein the plastic light-folding element is located on an image side of the imaging lens;
wherein a deviated distance between a center of the imaging lens and a center of the image sensor in a direction perpendicular to the optical axis is D, and the following condition is satisfied:

$$2 \text{ mm} < D < 22 \text{ mm}.$$

15. The camera module of claim 14, wherein the imaging lens and the image sensor are located on a same side of the plastic light-folding element.

16. The camera module of claim 14, wherein the deviated distance between the center of the imaging lens and the center of the image sensor in the direction perpendicular to the optical axis is D, and the following condition is satisfied:

$$4 \text{ mm} < D < 17 \text{ mm}.$$

17. The camera module of claim 14, wherein the image stabilization module comprises:
a second holder holding the image sensor;
a fixed base in physical contact with the second holder; and
a second driving mechanism configured to drive the second holder to move relative to the fixed base.

18. The camera module of claim 14, wherein an imaging light travelling along the optical axis in the plastic light-folding element undergoes total internal reflection.

19. The camera module of claim 14, wherein the plastic light-folding element has:
at least one gate trace; and
at least one reflection surface configured to fold the optical axis.

20. The camera module of claim 19, wherein a number of the at least one gate trace is one, and a number of the at least one reflection surface is three.

21. The camera module of claim 20, wherein two of the three reflection surfaces are symmetrically arranged with respect to the one gate trace as a center.

22. The camera module of claim 21, wherein a deviated distance between a center of the one gate trace and a center of one of the two reflection surfaces symmetrically arranged in a direction perpendicular to the optical axis is d1, a deviated distance between the center of the one gate trace and a center of other of the two reflection surfaces in a direction perpendicular to the optical axis is d2, and the following condition is satisfied:

$$|d1-d2| < 0.085 \text{ mm}.$$

23. The camera module of claim 19, wherein the plastic light-folding element further has at least one recessed structure extending and tapering off from an outer surface of the plastic light-folding element toward the at least one gate trace.

24. The camera module of claim 14, wherein an Abbe number of the plastic light-folding element is larger than or equal to 35 and smaller than or equal to 65.

* * * * *